US009593663B2

(12) United States Patent
Badakhshan et al.

(10) Patent No.: US 9,593,663 B2
(45) Date of Patent: Mar. 14, 2017

(54) PHOTO-IGNITION TORCH FOR COMBUSTION INITIATION AND GAS GENERATION

(71) Applicant: The United States of America, as represented by the Secretary of the Air Force, Washington, DC (US)

(72) Inventors: Alireza Badakhshan, San Pedro, CA (US); Stephen A Danczyk, Grande, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 23 days.

(21) Appl. No.: 14/925,383

(22) Filed: Oct. 28, 2015

(65) Prior Publication Data

US 2016/0123295 A1     May 5, 2016

Related U.S. Application Data

(60) Provisional application No. 62/073,552, filed on Oct. 31, 2014.

(51) Int. Cl.
| | |
|---|---|
| *F02P 23/00* | (2006.01) |
| *F02P 23/04* | (2006.01) |
| *F23C 99/00* | (2006.01) |
| *F42B 3/113* | (2006.01) |
| *G02B 6/00* | (2006.01) |
| *H01T 13/50* | (2006.01) |
| *H05H 1/46* | (2006.01) |
| *F23Q 13/00* | (2006.01) |

(52) U.S. Cl.
CPC ............ *F02P 23/04* (2013.01); *F23C 99/001* (2013.01); *F23Q 13/005* (2013.01); *F42B 3/113* (2013.01); *G02B 6/00* (2013.01); *H01T 13/50* (2013.01); *H05H 1/46* (2013.01); *F05D 2260/85* (2013.01); *F05D 2260/99* (2013.01)

(58) Field of Classification Search
CPC ................................ F02P 15/00; F02P 21/04
USPC .................... 123/143 R, 144, 145 R, 184
See application file for complete search history.

(56) References Cited

U.S. PATENT DOCUMENTS

| | | |
|---|---|---|
| 3,521,105 A | 7/1970 | Franks |
| 3,983,847 A | 10/1976 | Wyczalek et al. |

(Continued)

OTHER PUBLICATIONS

Ajayan et al., "Nanotubes in a Flash—Ignition and Reconstruction," Science vol. 296, p. 705 (Apr. 26, 2002).

(Continued)

*Primary Examiner* — John Kwon
(74) *Attorney, Agent, or Firm* — AFMCLO/JAZ; Charles Figer, Jr.

(57) ABSTRACT

A photo-ignition torch is provided including a light source configured to generate at least one of ultraviolet, visible, and infrared light. A photo-ignitable sub-micron particle mix is contained in capsule configured to receive the at least one of ultraviolet, visible, and infrared light generated by the light source or alternatively the photo-ignitable sub-micron particle mix is in direct contact with the light source. The exposure of the photo-ignitable sub-micron particle mix to the at least one of ultraviolet, visible, and infrared light initiates a photo-ignition process causing a release of burning byproducts of the photo-ignition process.

25 Claims, 13 Drawing Sheets

(56) References Cited

U.S. PATENT DOCUMENTS

| | | | |
|---|---|---|---|
| 4,122,816 | A | 10/1978 | Fitzgerald et al. |
| 4,308,488 | A | 12/1981 | Imai et al. |
| 4,332,223 | A | 6/1982 | Dalton |
| 4,493,297 | A | 1/1985 | McIlwain et al. |
| 5,813,379 | A | 9/1998 | Firey |
| 7,007,669 | B1 | 3/2006 | Willi et al. |
| 7,517,215 | B1 | 4/2009 | Chehroudi et al. |
| 7,665,985 | B1 | 2/2010 | Chehroudi et al. |
| 2003/0183504 | A1* | 10/2003 | Ajayan .......... B82Y 10/00 204/157.15 |
| 2007/0095047 | A1 | 5/2007 | Rozenberg |
| 2010/0266964 | A1* | 10/2010 | Gilje .......... B82Y 30/00 430/322 |
| 2012/0151931 | A1 | 6/2012 | Zheng et al. |
| 2014/0111784 | A1* | 4/2014 | Gilje .......... B01J 19/121 355/67 |

OTHER PUBLICATIONS

Braidy et al., "Oxidation of Fe Nanoparticles Embedded in Single-Walled Carbon Nanotubes by Exposure to a Bright Flash of White Light," Nano Lett., vol. 2, No. 11, pp. 1277-1280 (2002).

Smits et al., "Response of Fe Powder, Purified and as-produced HiPCo SWNT to Flash Exposure," Mat. Sci. Eng., vol. 358 (1-2), pp. 384-389 (2003).

Cote et al., "Flash Reduction and Patterning of Graphite Oxide and Its Polymer Composite," Am. Chem. Soc., 131 (31), pp. 11027-11032 (2009).

Gilje et al., "Photothermal Deoxygenation of Graphene Oxide for Patterning and Distributed Ignition Applications," Adv. Materials, 22 (3), pp. 419-423 (2010).

Singamaneni et al., "Unusual Ignition Behavior of Polyurethane/Carbon Nanotube Composites with a He—Ne Laser Excitation (632.8 nm) During Micro-Raman Spectroscopy," Carbon, 2006,44 (11), pp. 2191-2195 (2006).

Abboud et al., "Spatial and Temporal Control of On-Demand Propane-Air Flame Ignition by Active Photothermal Effect of Aluminum Nanoenergetics," Comb and Flame, 160 (9), pp. 1842-1847 (2013).

Manaa et al., "Flash Ignition and Initiation of Explosives—Nanotubes Mixture," Am. Chem. Soc., 127 (40), pp. 13786-13787 (2005).

Tseng et al., "Ignition of Carbon Nanotubes using a Photoflash," Carbon, 45, pp. 958-64 (2007).

Berkowitz et al., "The Photo-induced Ignition of Quiescent Ethylene/Air Mixtures Containing Suspended Carbon Nanotubes," Proc. Comb. Inst., 33 (2), pp. 3359-3366 (2011).

Finigan et al., "Deflagration-to-Detonattion Transition via the Distributed Photo Ignition of Carbon Nanotubes Suspended in Fuel/Oxidizer Mixtures," Comb. and Flame, pp. 1314-1320 (2011).

Badakhshan et al., "Ignition of Liquid Fuel Spray and Simulated Rocket Fuel by Photoignition of Carbon Nanotubes Utilizing a Camera Flash," JANNAF Meeting Liquid Prop. Subcommittee, Huntsville, AL (2011).

Badakhshan et al., "Photo-Ignition of Liquid Fuel Spray and Solid Fuel Through Carbon Nanotubes," TMS, 141st Ann. Meeting, Orlando, FL (2012).

Ostmark et al., "Laser Ignition of Explosives: Effects of Laser Wavelength on the Threshold Ignition Energy," J. Eng. Mat., vol. 12, pp. 63-83 (1994).

Joshi et al., "Laser-Induced Breakdown Spectroscopy for In-Cylinder Equivalence Ratio Measurements in Laser-Ignited Natural Gas Engines," Appl. Spectr., vol. 63, No. 5, pp. 549-554 (2009).

Phuoc, T.X., "Laser Spark Ignition: Experimental Determination of Laser-Induced Breakdown Thresholds of Combustion Gases," Optics Comm., 175, (4-6), pp. 419-423 (2000).

Badakhshan et al., "Photo-Ignition of Liquid Fuel Spray and Solid Rocket Fuel by Carbon Nanotube Utilizing a Camera Flash," Briefing Slides for presentation at JANNAF Meeting Liquid Prop. Subcommittee, Huntsville, AL (2011).

Wirth, David M., "Experimental Study on the Aerospace Applications of Photoreactive Nanomaterials," UCLA Master's Dissertaion, http://escholarship.org/uc/item/10h2d60v, (2012).

* cited by examiner

| NANOPARTICLE SAMPLES | PARTICLE SIZE/ SMALLEST DIMENSIONAL SIZE | MIN. IGNITION ENERGY/AREA, FLUENCE (mJ/cm$^2$) | IGNITION/ BURN TEMPERATURE (°C) |
|---|---|---|---|
| SWNT (51% Fe) | < 30nm | 64 ± 8 | 490 ± 30 |
| SWNT (18% Fe) | < 30nm | 182 ± 13 | 420 ± 50 |
| GRAPHENE OXIDE FOAM / NANOPLATELETS | <30 nm THICK PLATELETS | 500 ± 60 | 370 ± 100 |
| Al-NANOPARTICLES | 18nm | 290 ± 50 | 1100 ± 150 |
| Fe, CARBON COATED | ~40nm | 220 ± 35 | 250 ± 30 |
| Fe POWDER | ~30nm | 150 ± 25 | 220 ± 30 |
| Pd POWDER | ~12nm | 530 ± 60 | 320 ± 40 |

FIG. 1

| OUTPUT SETTING OF CAMERA FLASH | ESTIMATE PULSE DURATION (μs) | AREA UNDER CURVE (NORMALIZED TO M1/32) | RELATIVE POWER | MINIMUM IGNITION ENERGY/AREA (mJ/cm²) |
|---|---|---|---|---|
| CANON M1/1 | 5200 | 13.5 | 2.6 | 68±7, 13 |
| CANON M1/2 | 1100 | 4.5 | 4.1 | 48±6, 44 |
| CANON M1/4 | 600 | 2.5 | 4.2 | 45±6, 75 |
| CANON M1/8 | 350 | 1.6 | 4.5 | 37±5, 106 |
| CANON M1/16 | 200 | 1.13 | 5.7 | 31±4, 155 |
| CANON M1/32 | 120 | 1 | 8.3 | 28±4, 235 |
| CANON M1/64 | 80 | ~0.9 | N/A | NO IGNITION |
| CANON M1/128 | 60 | ~0.8 | N/A | NO IGNITION |
| PERKIN ELMER CX-1500 | 8-10 (FIXED) | N/A | N/A | 26 ± 3 |

| Fe CONTENT OF THE SAMPLE (Wt%) | SAMPLE APPEARANCE, AND ESTIMATED DENSITY | MINIMUM IGNITION ENERGY/AREA (mJ/cm²) |
|---|---|---|
| 51 | LIKE SOOT, VELVET BLACK, EXTREMELY FLUFFY, ~7g/L (~99.9% AIR) | 64 ± 8 |
| 43 | LIKE SOOT, VELVET BLACK, EXTREMELY FLUFFY, ~10g/L (~99.8% AIR) | 69 ± 9 |
| 39 | LIKE SOOT, VELVET BLACK, VERY FLUFFY, ~15g/L (~99.5% AIR) | 84 ± 10 |
| 30 | LIKE SOOT, BLACK, FLUFFY, ~20g/L (~99.5% AIR) | 99 ± 10 |
| 18 | LIKE SOOT, BLACK, FLUFFY, ~20g/L (~99.5% AIR) | 182 ± 13 |
| 12 | GRAY/BLACK POWDER, ~55g/L (~98% AIR) | NO IGNITION |
| 5 | GRAY/BLACK POWER, ~130 g/L (~95% AIR) | NO IGNITION |

FIG. 5

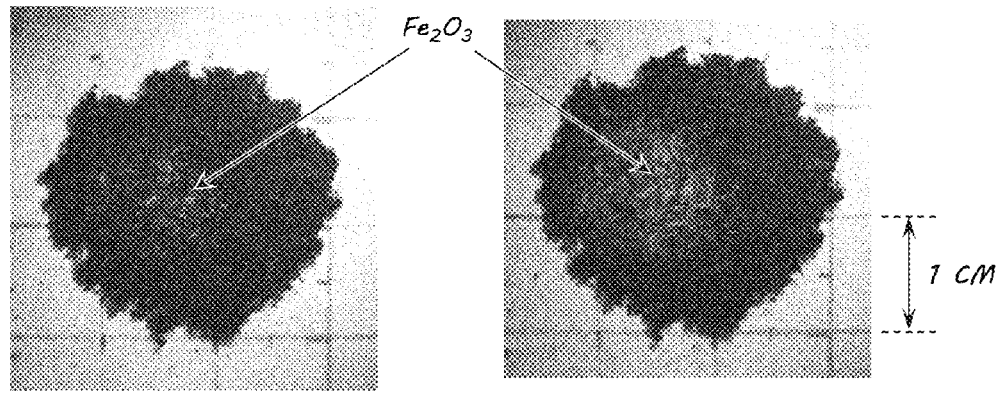

FIG. 6A          FIG. 6B

| CNT, MAIN PHOTO-IGNITION AGENT (WT%) | FUEL #1 AL_NP 18/80NM (WT%) | FUEL #2 SRF (WT%) | OXIDIZER#1 BKNO₃ (WT%) | OXIDIZER#2 KMNO₄ (WT%) | OBSERVATIONS AND COMMENTS ON THE RELATIVE EFFECTS OF ADDITIVES |
|---|---|---|---|---|---|
| SAMPLE 0 100% | | | | | Short burn duration & low burn Temp. (~800K) |
| SAMPLE 1 10% | | | 90% | | Improved ignition reliability & burn Temp. |
| SAMPLE 2 10% | | | | 90% | Reliable ignition only ≥ 10 atm |
| SAMPLE 3 ~3% | | ~97% | | | Unreliable ignition of SRF associated with a long ignition delay (ratio doesn't matter) |
| SAMPLE 4 3% | 7-12% | 85-90% | | | More reliable ignition, burns at higher T & is more energetic than sample 2 & 3 |
| SAMPLE 5 3% | 7% | 45% | | 45% | Less reliable ignition than the above unless the chamber Pres. ≥ 10 atm |
| SAMPLE 6 3% | 7% | 50% | 40% | | Improved flash sensitivity & ignition + generate a lot of gas & smoke |
| SAMPLE 7 1% | 9% | 80% | 10% | | Best ignition sensitivity, reliability & burn duration for chamber Pres. ≥ 7 atm |
| SAMPLE 8 2% | 8% | 70% | | 20% | Comparable to sample 7 only for chamber Pres. ≥ 15 atm |
| SAMPLE 9 2% | 8% | 70% | 20% | | Improved ignition reliability and burn duration |
| SAMPLE 10 1% | 15% | 75% | 9% | | As good as the above @ Atm. Pres., but burns too fast ≥ 15 atm |

FIG. 9

PHOTO-IGNITION TORCH FOR COMBUSTION INITIATION AND GAS GENERATION

CROSS-REFERENCE TO RELATED APPLICATIONS

This application claims the benefit of and priority to U.S. Provisional Application Ser. No. 62/073,552, entitled "Self-Contained Photo-Ignition Torch as Combustion Initiator and Gas Generator," filed on Oct. 31, 2014, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to ignition devices and, more particularly, photo-ignition devices.

Description of the Related Art

Ignition in propulsion systems is established by a number of different methods, most often through one of many electrical ignition devices. In liquid-fueled systems, for example, plasma torches may be employed. Alternatively, electric spark plugs may be used to initiate a gas burning torch. In many cases, relatively heavy components may need to be employed. And, many of these ignition systems may further require additional gas/fuel tanks, pumps, values, and parts, each of which may introduce reliability issues.

Different categories of propulsion systems may have different ignition requirements. For liquid-fueled propulsion systems, where electrical ignition is often employed, fuel and oxidizer must be effectively mixed in proper proportions to have a controlled rate of production of hot gases. A "hard start" in one of these systems indicates that a quantity of combustible propellant that entered a combustion chamber prior to ignition was too high, preventing the ignition system from establishing complete combustion throughout the combustion chamber. The result is generally an excessive spike of pressure, possibly leading to structural failure or even potentially an explosion. These and other conventional methods of ignition may also have issues associated with flame propagation and the combustion wave. They may rely on propagation of ignition through booster charges or pyrophoric materials in order to establish ignition in a combustion chamber (with the exception of hypergolic ignition), which may also contribute to "hard start" conditions.

In electric ignition systems, conductive wires connect explosive material to an electric source, which may require protection against electrostatic discharge (ESD) to avoid unintentional firing. However, use of ESD protection devices may introduce reliability issues into the system. Alternatively, another category of electric ignition employs a low voltage electrical current to generate heat for ignition instead of a spark. For example, many solid-fueled propulsion systems are usually ignited with one-shot pyrotechnic devices, generally including different forms of explosive bags and pellet baskets. These systems are typically initiated by an electric ignition source, often a resistive wire, generally known as an "electric match." Upon receiving an electrical signal, the initiator ignites a small solid pyrotechnic, generally known as a squib or primer charge. Then, a booster charge is ignited by heat released by the squib, which in turn ignites the main propellants within a fraction of a second. However, such systems may suffer from slow starts, as well as problems similar to ESD systems. In multigrain systems, pressurization of void volume and creation of a desirable delay between successive stages may present additional challenges.

Some liquid fuel/oxidizer combinations ignite on contact (hypergolic). Other non-hypergolic fuels may be "chemically ignited" by priming fuel lines with hypergolic propellants. In these systems, the chemical ignitions may present corrosiveness, toxicity, and reliability issues. Additionally, there may are also be issues associated with timely ignition and propagation of flame throughout a sizable combustion chamber, which becomes more of a challenging issue for larger engines.

An alternative to the above ignition categories is laser ignition. Laser ignition is typically used for ground-based initiators and it is usually external to the flying propulsion systems or spacecrafts, due to its heavy weight and high power consumption. In this approach, an external laser shoots a high power beam of light into a combustion chamber for a one-shot ignition. The lack of any electrical contacts with the ignitable material is one of the advantages of laser ignition, thus eliminating hazards identified above including associated electrostatic discharge (ESD). However, laser ignition is less common in typical propulsion systems, because it requires a relatively powerful laser that is bulky and costly in addition to the high power requirement.

Accordingly, there is a need in the art for low energy, portable ignition technologies that satisfy the numerous requirements while maintaining simplicity.

SUMMARY OF THE INVENTION

Embodiments of the invention address the need in the art by providing a small, light-weight photo-ignition torch. A light source is configured to generate at least one of ultraviolet, visible, and infrared light. A photo-ignitable sub-micron particle mix is contained in a capsule configured to receive the at least one of ultraviolet, visible, and infrared light generated by the light source. The exposure of the photo-ignitable sub-micron particle mix to the at least one of ultraviolet, visible, and infrared light initiates a photo-ignition process causing a pressure increase in the capsule and a release of burning byproducts of the photo-ignition process. In some embodiments the capsule is transparent and the photo-ignitable sub-micron particle mix is exposed to the light generated from the light source through the capsule. In other embodiments, light may be directed to the photo-ignitable sub-micron particle mix, through a window in the capsule or via optical fibers. In still other embodiments, the photo-ignitable sub-micron particle mix may directly contact the light source.

In some embodiments, the exposure of the photo-ignitable sub-micron particle mix to the at least one of ultraviolet, visible, and infrared light initiates the photo-ignition process causing the pressure increase in the capsule and the release of burning byproducts of the photo-ignition process in an environment with a pressure level in excess of 300 psi. In these and other embodiments, a temperature of the burning byproducts of the photo-ignition process may be in excess of 500° C.

In some embodiments the capsule of the photo-ignition torch may include a burst disk sealing an orifice in the capsule. The burst disk fails at a designated pressure in the capsule causing the release of the burning byproducts of the photo-ignition process in a stream through the orifice. In other embodiments, there is no burst disk and the burning byproducts of the photo-ignition process are released in a stream through the orifice as pressure increases in the capsule.

Some embodiments are packaged in a ignition vessel encompassing the capsule and the light source. The ignition vessel includes an orifice at one end of the vessel. The burning byproducts of the photo-ignition process released from the capsule are released in a stream through the orifice. Some embodiments of the photo-ignition torch further include a booster charge located proximate the capsule for applications requiring higher generated pressures, temperatures, and/or longer burn times. In some embodiments, the ignition vessel may be divided into compartments separated by at least one wall. Each compartment includes at least a capsule containing the photo-ignitable sub-micron particle mix and a light source configured to generate at least one of ultraviolet, visible, and infrared light.

In some embodiments the photo-ignitable sub-micron particle mix includes carbon nanostructures and a high temperature fuel selected from: thermite, metallic nanomaterials, solid oxidizer, solid propellant, any form of black powder or pyrotechnic/pyrolant composition including carbon, boron, beryllium, iron, lithium, magnesium, nickel, silicon, titanium, tungsten, zinc, zirconium, and aluminum, and combinations thereof. The photo-ignitable sub-micron particle mix in these and other embodiments may also include an oxidizer selected from: copper-oxide, barium oxide, lead oxide, manganese oxide and iron-oxide, thermites, ammonium perchlorate oxidizer, ammonium nitrate, potassium nitrate, potassium perchlorate, boron potassium nitrate, and potassium permanganate and other metal-oxidizer mixtures such as aluminum-potassium perchlorate and titanium-aluminum-potassium perchlorate, ZPP and BNCP, and combinations thereof.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 contains a table including minimum ignition energy (MIE) for different nanostructured materials and their corresponding burn temperatures;

FIG. 5 contains a table including MIE for SWNT samples with different Fe content under ambient air, i.e. atmospheric condition;

FIGS. 6A and 6B are examples of photo-ignition process in a compacted sample with a 10 lbf (44 N) compaction force in ambient air;

FIG. 9 contains a table including ingredients for a photo-ignition torch ignited by a camera flash at different chamber pressures;

Figure 2:
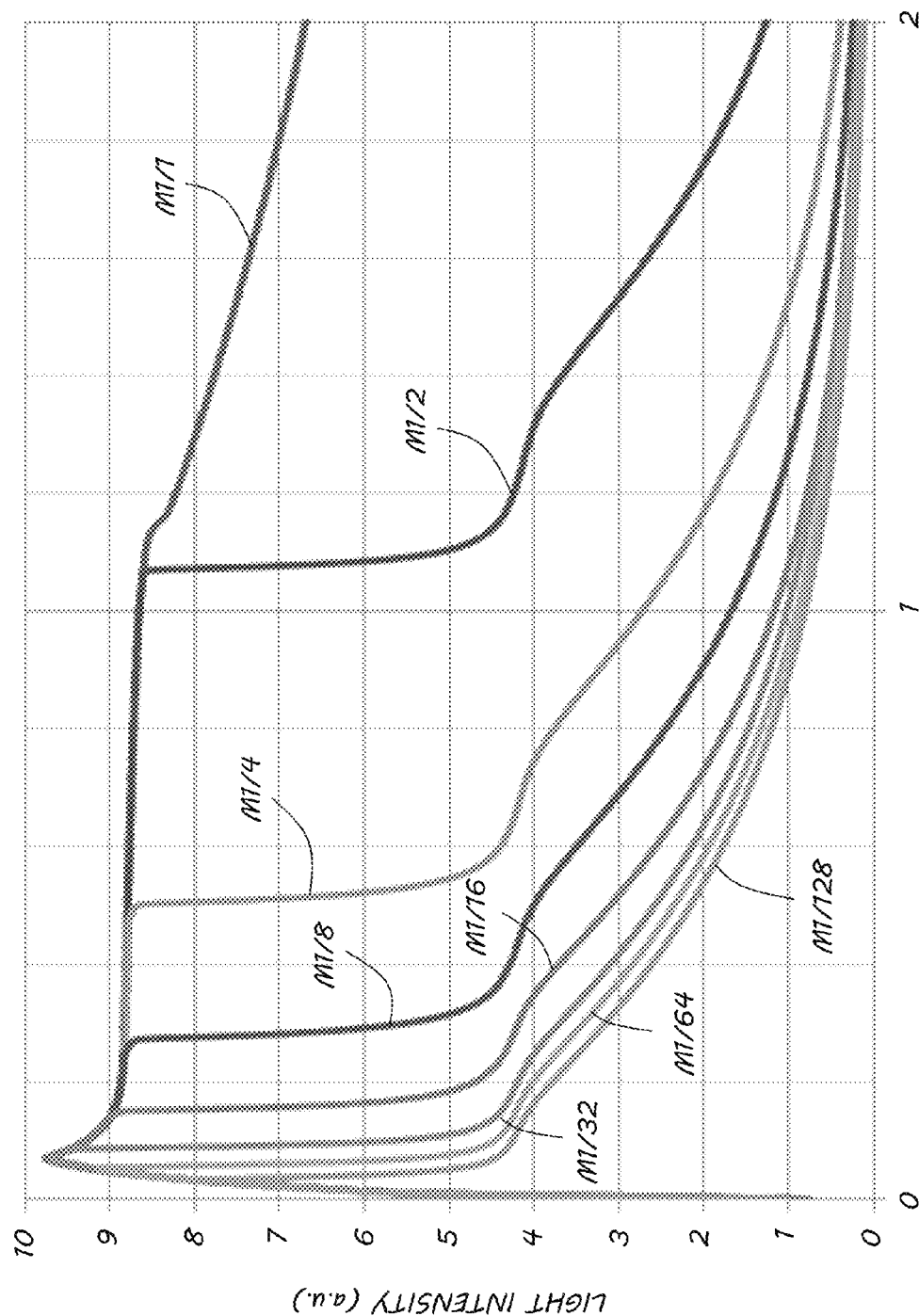
FIG. 2 is a graph of maximum temporal output of Xe-arc source for different power output settings of a Canon 580-XII Xe camera flash as seen by a DET36A fast photodiode detector.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

There are a number of properties that are desirable for ignition systems. Ideally, an ignition system should be robust, efficient, reliable, simple, low cost, and flexible. The capability for a given ignition system to initiate combustion under a broad range of conditions, including different fuels, is ideal to maximize operational flexibility for energy and propulsion systems. When ignition systems rely on high reactivity additives, such as hypergolic or pyrophoric reactants, handling and storage of these specialized chemicals may be complicated by safety and health concerns.

Embodiments of the invention provide an ignitor based on photo-ignition of carbon nanotubes. A photo-ignition torch offers simplicity, good repeatability, rapid and simple preparation, and minimal reactant mass. The ignitor reactants may be tailored to provide robust and reliable ignition for a given fuel/oxidizer combination at a given operating state.

Photo-ignition tests were initiated with a Xe-flash energy well below minimum ignition energy (MIE). The optical fluence on the sample was incrementally increased until the ignition was observed, and the MIE for the sample was determined. The energy per pulse was measured at each step and the sample was examined before and after exposure to each flash in order to verify the occurrence of photo-ignition. In most cases the onset of the photo-ignition was easily identifiable through change of color of the sample due to the formation of orange iron oxide. Care was taken to make sure that the repeated exposure to the Xe-flash at energies below MIE did not affect the onset of the ignition of the sample. This was achieved by evaluation of MIE by two methods, first through step-by-step increase in optical fluence and then by verification of that value of MIE on a virgin sample.

Ignition characteristics of Single-Wall Nanotubes (SWNT) and a number of other nanoparticles or nanostructured materials were studied and MIE was determined for these materials, as indicated in the table in FIG. 1. Samples of the SWNT, which were synthesized by a HiPco process, were obtained from Unidym Corp, Houston, Tex. The carbon nanotubes in these samples are believed to be predominantly SWNT, according to the vendor. Additional samples included Fe nanoparticles encased in SWNT and Fe particles and nano-clusters outside of SWNT as well as carbon impurities possibly in an amorphous form. Additionally, photo-ignition properties of other materials such as multi-walled CNT, C60 fullerenes and SWNT and multiwall carbon nanotubes from different vendors as well as carbon black, metallic and nonmetallic fine particles, and ball milled metallic thermites were studied producing mixed results. The table in FIG. 1 only includes materials that are well characterized and showed a more consistent photo-ignition effect. The stated error figures are the measured statistical variations for the first four samples and they are the estimated uncertainty for the last three samples.

As seen from the table in FIG. 1, SWNT samples with 51% Fe content exhibited the lowest MIE and aluminum nanoparticles exhibited the highest burn temperature. Values of ignition temperature were measured by a pyrometer with 10 µs response time, which was focused on a 2 mm spot on the sample. While the temperatures in the table in FIG. 1 may not be a good representative of the entire sample, the relative values of burn temperature for different nanostructures are of interest here. All of the materials that are reported in the table in FIG. 1 have purities greater than 95% except for SWNT that needed to be in an as-grown form, i.e., unpurified condition, in order to produce the lowest possible MIE. For SWNT, the study was expanded to include MIE as a function of light characteristics such as the wavelength and the Xe-flash duration, as well as sample properties such as the compaction and the Fe content of carbon nanotube (CNT) samples.

The effect of wavelength on the photo-ignition of SWNT samples within the spectral range of 300-1600 nm was also investigated. Different combination of optical filters were utilized, including band pass, long pass and short pass filters, in order to produce several spectral regions/bands, 250-400 nm each, covering the entire 300-1600 nm range. These band-pass regions were dictated by the amount of light output of the source that was available to induce photo-ignition and to a lesser extent by the availability of the suitable optical filters.

The results of this study indicate that there is no particular spectral range to which photo-ignition of SWNT samples are noticeably more sensitive to the wavelength of the light. This is in light of the experimental limitations of the spectral span that arises from the limited optical fluence of the compact Xe-flash source. While there are Xe-flash sources with much higher energy/flash output, Canon model 580 XEII offers the highest fluence among Xe-flash sources with close to a millisecond pulse duration that are available in the market.

High emissivity of carbon-rich materials other than SWNT was also studied, including high purity SWNT, C60 fullerenes, samples of carbon black, and activated charcoal in order to gain a better understanding of the interaction of light with such materials. Despite their similarities with SWNT, none of these materials exhibited photo-ignition effect with the maximum available fluence of about 1.4 $J/cm^2$. However, photo-ignition of graphene nano-platelet samples in the table in FIG. 1 confirms that presence of Fe or metal nanoparticles is not necessary for photo-ignition of nanostructured carbon. Also, a similar photo-ignition of porous silicon films by a camera flash shows that photo-ignition can be induced in nanostructured material without any metal nanoparticles. This simply indicates that presence of Fe/metal nanoparticles is not required for photo-ignition, but it does not mean that metal nanoparticles have no role to play in the photo-ignition effect.

In the course of studying the effect of wavelength on MIE it became necessary to select different output settings of the Canon model 580 XEII Xe-flash, the results of which showed different minimum ignition energies for identical samples. A series of investigative measurements made it clear that the light level setting of the Xe-flash inadvertently changed the pulse duration of the light as well, which has a profound effect on MIE. This finding led to the study of the effect of pulse duration on photo-ignition utilizing the Canon Xe-flash with 22-step output setting with as many flash pulse duration selections within 60-5200 µs range. This also dictated that any comparative data such as the values in the table in FIG. 1 had to be produced with a single setting of the Xe-flash. In producing the data of the table in FIG. 1 the change in the optical fluence on the sample was achieved solely through the adjustment of the distance between the sample and the light source, mediated by a fiber bundle that was 12 mm in diameter and about 1 m in length.

FIG. 2 is a graph of maximum temporal output of Xe-arc source for different power output settings of a Canon 580-XII Xe camera flash as seen by a DET36A fast photodiode detector of about 1 millisecond and output energy of about 1.2 $J/cm^2$ per pulse, somewhat similar to M1/4 in the figure. The graph in FIG. 2 shows the temporal output curves for a Canon 580-XII Xe flash lamp, covering an estimated pulse duration range of 60-5200 µs. There are also two finer steps of available output in between each of the output settings that are shown in FIG. 2. Photo-ignition was induced in the SWNT samples with 43% and 51% Fe content for all but the two lowest output settings of Canon 580-XII camera flash. The curves in FIG. 2 are produced by the temporal response of the DET36A fast photodiode detector which has a response time of 14 ns. In this case, the light source and the detector are kept in place while the power setting was adjusted to cover the entire range. While the maximum pulse height may not be a good representation of the output at each setting of the Xe-flash, the area under the curve is a reasonable representative of the photon energy that the sample receives.

Figures 3, 4:
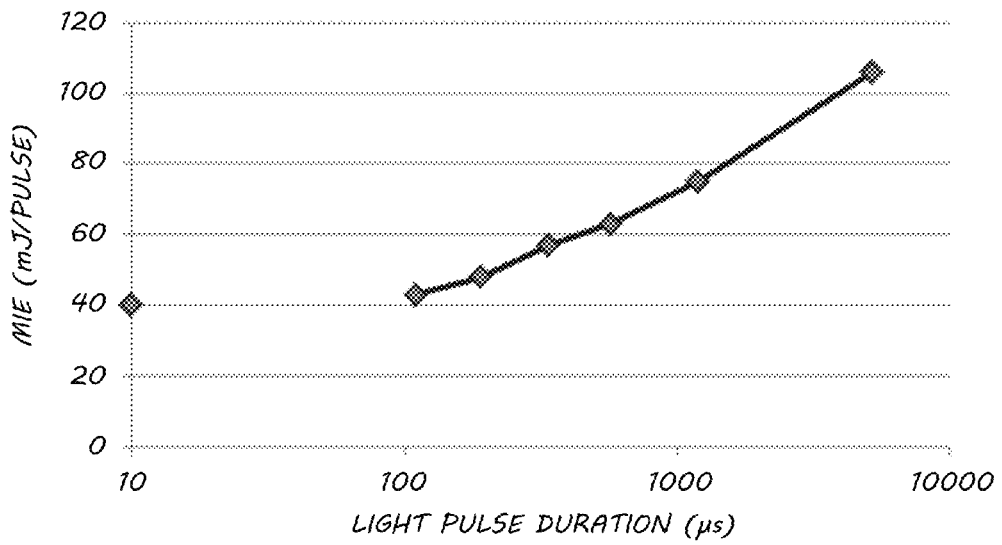
FIG. 3 contains a table including MIE for SWNT samples at different pulse durations of the Xe-flash of FIG. 2.
FIG. 4 is a graph of MIE for photo-ignition of SWNT samples as a function of flash pulse duration of 580-XEII light source.

In explaining the possible mechanism for the photo-ignition effect, it is important to emphasize that the curves in FIG. 2 are the "raw" data and are not normalized to the peak. The photo-ignition effect is concerned with the energy/optical fluence in each case. This is the total optical energy that is seen by the sample and it is directly correlated with the area under each light output curve in FIG. 2. The table in FIG. 3 shows the MIE as a function of the estimated pulse duration for SWNT samples with 43% Fe content. It should be noted that the stated pulse duration values are the best estimate of "full width half max" in FIG. 2. The fact that it takes a relatively lower fluence for shorter light pulse durations to induce photo-ignition in SWNT samples reveals a peculiar characteristic of the photo-ignition effect, which will be discussed further below.

In order to gain a better understanding of the data in the table in FIG. 3, the data trend was described in MIE as a function of pulse duration of the flash in a logarithmic scale as shown in FIG. 4. The area under the curve for the Xe-flash with 120 μs duration was arbitrarily selected as the reference or the unit energy for comparison purposes. However, the lowest pulse duration entry in the table in FIG. 3 is from CX-1500 Xe-flash strobe light by PerkinElmer and was not included in this analysis because it was from a different Xe-flash source and its temporal output does not necessarily correlate with those of FIG. 2, though it is in general agreement with the data trend in FIG. 4.

In order to identify the possible influence of Fe nanoparticle content on the photo-ignition effect in SWNT samples, MIE for several samples with different Fe concentrations were measured. The results of this study for pulse duration of about 600 μs are summarized in the table in FIG. 5. All of these samples were from the same vendor Unidym Corp, Houston, Tex. and were grown by the same method and under comparable experimental conditions. In addition to the differences in their Fe contents, these samples have different appearances as well. The samples with the higher Fe content are soot-like, with a density of 10-25 g/L and look velvet black. The samples with lower Fe content appeared more like a dark gray/black powder with much higher density as indicated in the table in FIG. 5. Photo-ignition of samples with the Fe content as low as 18% was achieved by the Canon Xe-flash source with the highest available optical fluence. This suggests that in addition to Fe content, the method of the synthesis of SWNT and the supplier may influence the MIE. SWNT samples from a different vendor were examined with specified Fe content of 70% that exhibited a considerably higher MIE than some of the samples in the table in FIG. 5 with much less Fe content.

The SWNT samples with the lowest MIE are the as-grown samples with Fe content higher than about 40%. These happen to be samples with an extremely low density, i.e., samples that they are easily airborne (>99.5% air by volume). Considering the fact that the best as-grown SWNT samples have a density of 5-10 g/L and they are made of ~50% carbon and ~50% Fe atoms, it can be concluded that only a small fraction of 1% of the volume of the sample is occupied by carbon and Fe atoms. Therefore, in the investigation of the possible cause of photo-ignition the effect of compaction on the ignition characteristics of the as-grown SWNT was of particular interest. Moreover, utilization of SWNT as an ignition agent for rocket applications may require samples with as little volume as possible, preferably made into pellets or films as may be produced by compaction of as grown samples.

In order to produce a relatively dense SWNT sample, different physical methods were attempted and it was concluded that mechanical compaction is the best approach. Mechanical compaction was achieved by placing a small volume of the "fluffy" SWNT between two glass slides and compressing it with a known force/weight. Then the top glass slide was removed so that the surface of the sample was exposed to air and the ignition tests were performed through the same procedure that was previously described for fluffy samples, i.e., incremental increase in photon energy until the onset of photo-ignition was reached and the sample was ignited.

The MIE for samples with 43% Fe content by weight that were compacted by different compaction forces between 0.35-30 lbf (1.5-135 N) were investigated and the occurrence of photo-ignition was determined by the inspection of a digital image of the sample. While compacted samples have much less volume and are not fluidized like as-grown samples they still remain super porous containing 97-99.5% air by volume for the stated force of compaction. Generally, it proved to be quite difficult to determine a specific threshold for MIE for compacted samples, because they exhibited relatively few "ignition spots" with exposure to a relatively low level Xe-flash. FIGS. 6A and 6B show an example of photo-ignition in a compacted sample indicating the gradual nature of the ignition, a characteristic that was directly proportional to the optical fluence received by the sample. The image in FIG. 6A was produced after 25 incrementally increasing exposures to the Xe-flash starting at a very low energy output of the light source. The image in FIG. 6B shows the same sample after the process continued for 5 additional steps/exposures while successively increasing the light output each time. Samples that were compacted with a larger force showed the same gradual photo-ignition characteristic exhibited in FIGS. 6A and 6B, albeit at relatively higher optical fluencies. For a compaction force >80 lbf (355 N) there was hardly any photo-ignition spots at the highest available fluence of 1.4 J/cm$^2$. Note that according to FIG. 2, the highest available fluence is directly correlated with the pulse duration and the output setting of the camera flash. Therefore, for any set of the reported data the same output setting was maintained and the fluence on the sample changed by adjusting the distance between the input side of the fiber bundle light guide and the camera flash. The drawback of this approach was reduced light coupling efficiency so that a maximum fluence of 1.4 J/cm$^2$ was measured with fiber coupling and 3.5 J/cm$^2$ without it.

Partial photo-ignition is evident in FIGS. 6A and 6B through the appearance of a number of $Fe_2O_3$ spots randomly dispersed on the surface of the sample. However additional spots appear after each instance of exposure to a flash of light with an incremental increase in optical fluence, as shown in FIGS. 6A and 6B. In each case the additional spots on the sample that changed color due to exposure was determined though inspection of photographic images before and after each successively-increasing exposure. The fact that MIE is increased due to compaction can be explained by the increase in density, which also increase the thermal mass of the sample and possibly increases its thermal conductivity. However, this does not explain why only a handful of randomly distributed hotspots experience photo-ignition after every slightly increased exposure.

It is important to note that what brings the change in the two photographic images in FIGS. 6A and 6B is not the number of additional exposures, but the incremental increase in the optical fluence from one exposure to the next. If the optical fluence was kept constant, several additional exposures at the same fluence level would not noticeably increase the number of the $Fe_2O_3$ spots on the sample. Repeated tests showed that very few ignition "hot spots" exhibited photo-ignition by the repeated exposure at the same optical fluence. Apparently, the remaining hot spots within the exposure area have higher photo-ignition thresholds. This led to the belief that there are randomly distributed ignition hot spots with a wide range of MIEs. These hot spots act as photo-activated microcavities and each group of "similar" microcavities exhibit photo-ignition at a certain optical fluence level of the Xe-flash. In other words, at each exposure level there seems to be a certain range of microcavities that are in resonance with the arriving photons and they become hot enough to ignite. No more microcavities experience photo-ignition, unless the fluence of the exposure is increased by another increment.

The effect of pulse duration on the photo-ignition process is quite important in understanding the photo-ignition effect. This is best understood through an example of relative energy or area under the curve for each light output setting of the Xe-flash. For instance based on FIG. 2 and the table in FIG. 3, while the M1/32 output setting of the Xe-flash delivers about 13 times less energy than the M1/1 setting, it does it about 43 (=5200/120) time faster so M1/32 is more efficient in inducing the photo-ignition effect as indicated by its substantially lower MIE value. The forth column in the table in FIG. 3 provides a measure of relative average power for those pulse durations in FIG. 2 that share the same peak point. A possible explanation for the effect of pulse duration on photo-ignition is that the shorter pulses have more average power. While the flash with longer pulse duration may deliver more energy, it may not necessarily have a larger "peak power", as will be explained. This can be easily verified by comparing the area under the two curves in FIG. 7 that are derived from FIG. 2 as its subset.

Figure 7:
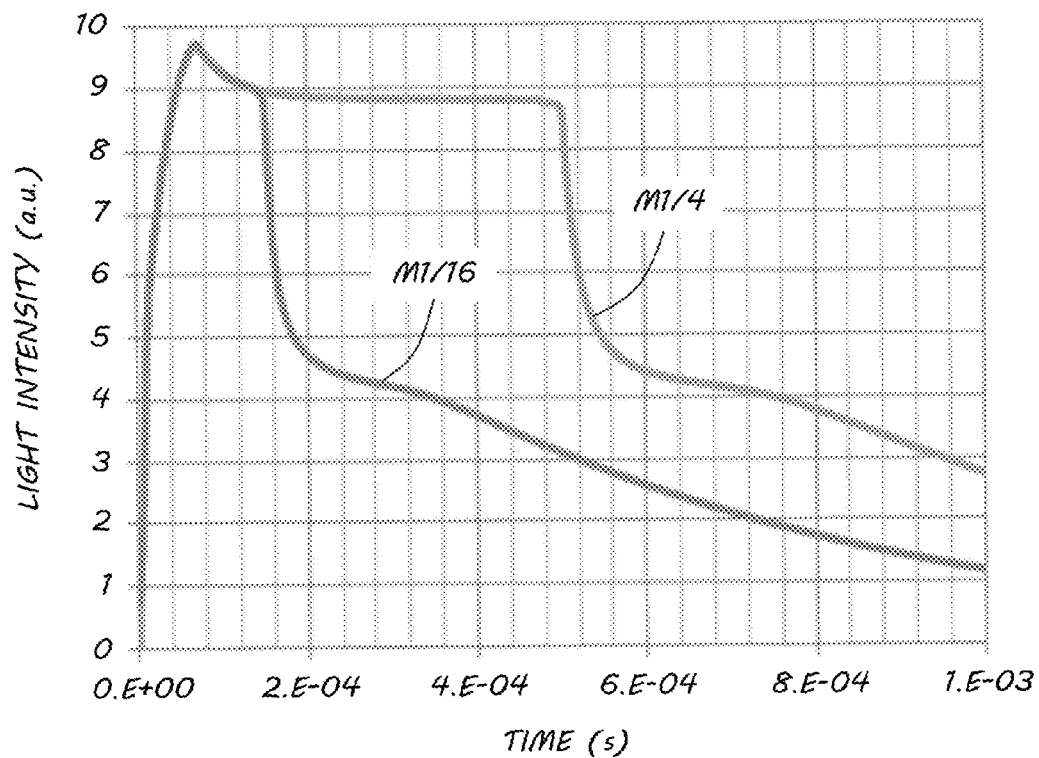
FIG. 7 is a graph of selected portions of the graph in FIG. 2.

In this case the shorter pulse delivers the same "power" in the first 200 μs as the longer pulse, while it has about half as much energy or total number of photons delivered to the SWNT sample overall. Therefore, for any two Xe-flash output settings with noticeably different pulse durations, the one with the relatively shorter pulse exhibits a relatively higher "rate of temperature increase," if the optical fluence on the sample is set/measured to be the same. To clarify, assume that in two separate experiments the experimental condition was set so that the same photon energy is measured for the two light output settings of M1/4 and M1/16 at the location of the sample. In reference to the two curves that are shown in FIG. 7, this means that the M1/16 curve needs to have a much higher peak value in order to produce the same area under the curve as M1/4. This clearly shows that the peak power for the shorter pulse must be higher, if it is set to produce the same optical fluence as the longer pulse. The same argument holds for the relative peak power of any other pair of curves in FIG. 2. Therefore, in photo-ignition application it is not enough to state the Xe-flash output based on the reading of the power meter. The power setting or pulse duration has to be considered as well, because the latter has a direct effect on the rate of temperature increase, as indicated by the rising edge of the curves in FIG. 2.

While the absorption of photon energy by the high-emissivity SWNT sample is quite important in the temperature rise of the sample, it is only part of the optical processes involved in the photothermal effect leading to photo-ignition of SWNT. The energy loss, which is expected to be dominated by "black body" radiation, is the main parameter that prevents the temperature rise of the photo-ignition hot spots. While some energy loss due to conduction cannot be ruled out in the compacted samples, the heat loss by convection is expected to be negligible. On the other hand, in ordinary solids with high emissivity, the rate of absorption of photons from a given light source and the subsequent re-radiation of the photons in infrared due to the blackbody effect has a timescale that is in nanoseconds. However, the timescale of the photothermal effect in photo-ignition is much slower than that, by orders of magnitude. This may be related to the unusual structure of SWNT samples, which is more like a loose bundle of yarn-like long and entangled nanoscale filaments. This makes radiation trapping within the sample a reasonable possibility. It is important to note that the term sample is a reference to the photo-ignition hot spots or microcavities within the sample, as shown in FIGS. 6A and 6B.

In explaining the observed photo-ignition effect in FIGS. 6A and 6B, it is conceivable that there exist microscale pockets of radiation trapping hot spots or resonant microcavities dispersed in the highly porous samples which are responsible for the abrupt increase in the temperature of the sub-millimeter spots within the SWNT samples leading to its ignition. As such, the Xe-flash radiation that enters such a microcavity is absorbed by the cavity and raises the cavity temperature. Subsequently, the cavity reradiates energy at a range of longer wavelength so that a resonance condition is met for certain wavelengths leading to enhancement in the photothermal effect.

Based on the above analyses, samples of SWNT with different nanoparticle Fe content obtained from Unidym Inc., Houston, Tex. were selected to be used with embodiments of the invention. The samples were as grown SWNTs with high concentration of unintended impurities (about 50% by weight, mostly Fe and carbon nanoparticles), where carbon nanotubes were believed to be predominantly SWNT, based on the evidence presented by the vendor. The term CNT is used for the samples utilized with the embodiments of the invention in order to indicate that they were not purified SWNT samples, but instead, they contained substantial impurities. Contrary to photo-ignition, most applications of CNTs require high concentration of CNTs and low concentration of Fe, which explains the need for the often elaborate purification process. However, purified samples show considerably higher photo-ignition threshold as tested, thus ill-suited for photo-ignition applications. The same batch of as grown CNTs were used for all photo-ignition embodiments here, the as grown CNT samples with nanoparticle Fe content of 51 wt. %, as stated by the vendor. In certain cases some solid additives were used along with CNTs, which are collectively referred to as CNT mixture.

The ignition light source was a modified version of the compact Xe-flash that is used in a disposable camera. This type of light source proved to be quite reliable and the Xe-flash bulb is suited for high pressure applications as investigated, so that it functions quite well after many cycles of 1-135 atm (15-2000 psi). The same Xe-flash unit was repeatedly used for ignition at elevated pressures up to about 50 atm (~750 psi).

Embodiments of the invention were tested under three different setups for fuel ignition. The first setup was used for observation of the dynamics of photo-ignition process at atmospheric pressure with the full view of the ignition source and the ignition process. The second setup, utilized a mid-pressure test chamber (MPTC) to observe a torch function of the embodiments of the invention inside an ignition test chamber with up to about 30 atm (~450 psi) of ambient pressure. The third setup was a compact high-pressure ignition torch (HPIT) chamber that was made of brass and was designed for photo-ignition experiments up to about 135 atm (~2000 psi) of pressure in GOX environment. The HPIT was attached to a high-pressure $O_2$—$H_2$ combustion chamber that was designed for operation up to about 100 atm (~1500 psi). The HPIT was utilized for quantitative measurements of photo-ignition criteria for the realization of ignition at different pressures and temperatures within the $O_2$—$H_2$ combustion chamber.

An intended use for embodiments of the invention is for combustion of liquid fuel injectors for combustion research related to rocket applications. The proof-of-concept experiments summarized above indicate that this is a viable approach. However, it was observed that the samples that were partially-wet due to exposure to the mist from the liquid fuel spray required a substantially higher light fluence (energy per unit area) for realization of photo-ignition. The high fluence requirement made photo-ignition of fuel sprays very difficult to implement for most applications, because the CNT sample is usually located close to the fuel spray in order to induce initiation of combustion through photo-ignition.

Figure 8:
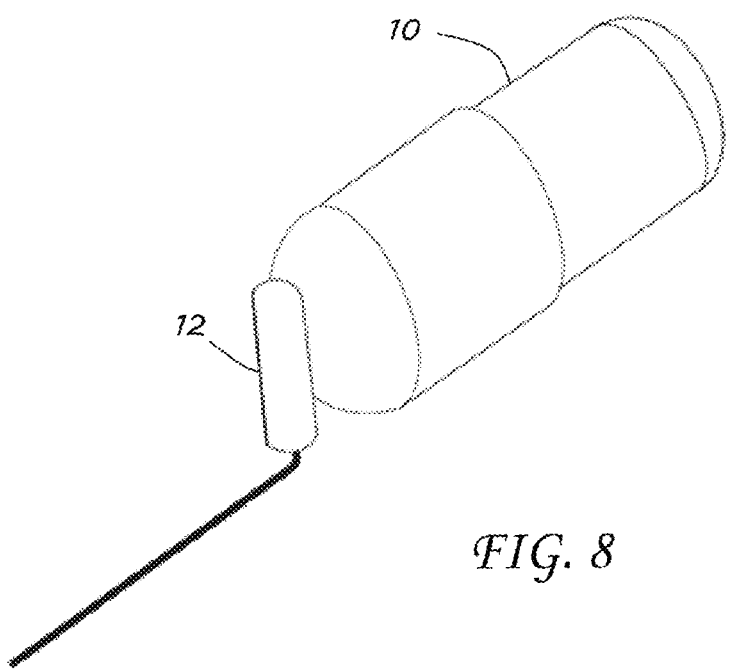
FIG. 8 shows an exemplary transparent capsule and light source.

In order to overcome the stated problem with partially-wet samples two methods were implemented in embodiments of the invention to keep CNT samples dry while they were kept in the vicinity of liquid fuel. The first method was encapsulation of CNT photo-ignitable sub-micron particle mixture in a transparent capsule and the second one was lamination of CNT along with a solid oxidizer in thin layers of a transparent polymer. Both methods proved to be effective, but the encapsulation was more reproducible and easier to implement for high-pressure applications. Thus, encapsulation of CNTs along with any solid additives was employed with the embodiments of the invention used with applications for the ignition of liquid fuel/oxidizer flows. As illustrated in FIG. 8, the CNTs were placed in transparent capsule 10, which is juxtaposed with the light source 12. Examples of CNT mixtures used with embodiments of the invention are presented in the table in FIG. 9.

Figure 10A:
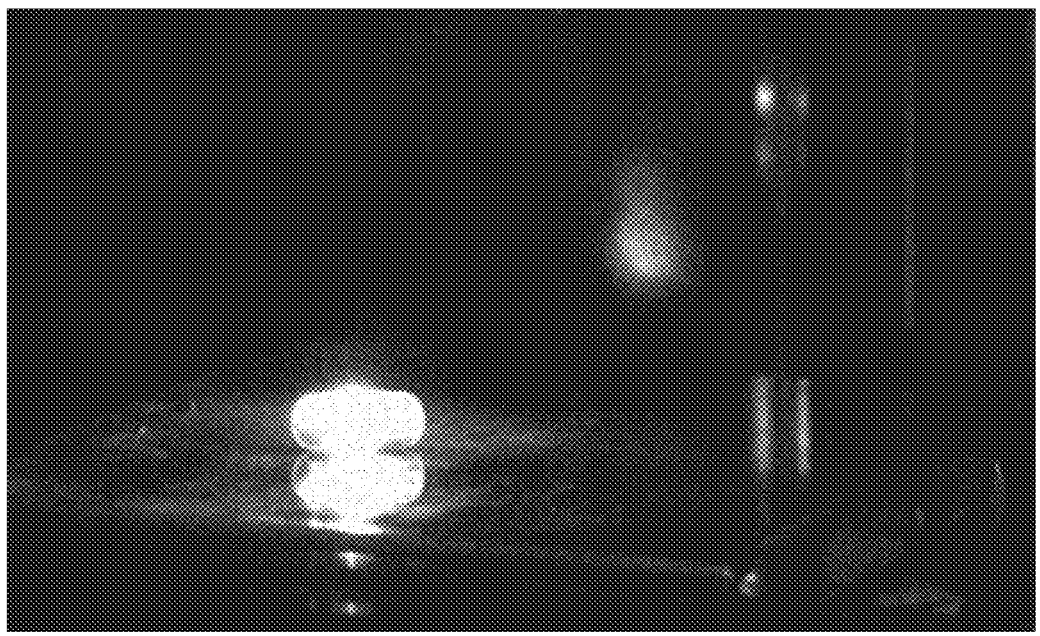
FIGS. 10A-10C are snap shots of a rupture of an ignition capsule.
Figure 10B:
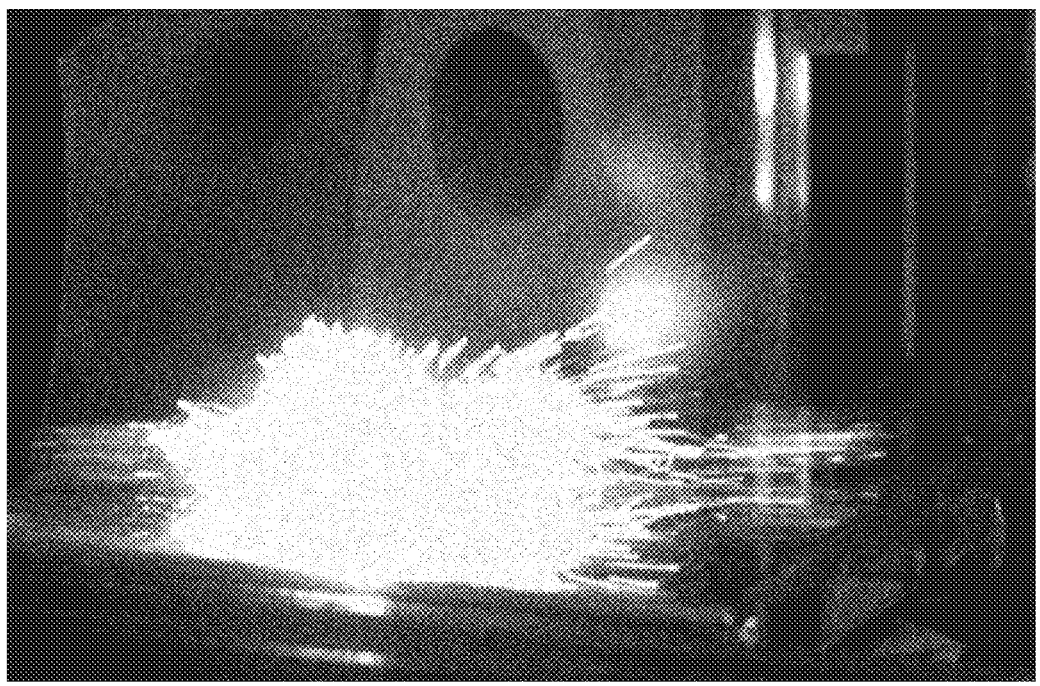
Figure 10C:
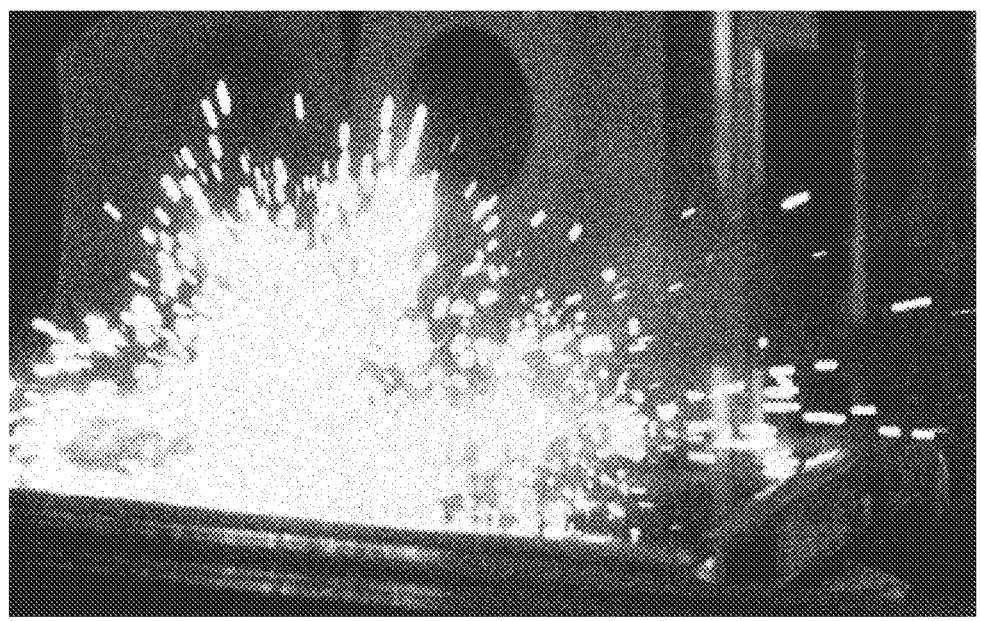

Encapsulated CNT mixtures were prepared by placing the mixture in a transparent container about 0.75-$cm^3$ in volume (D=7-mm L=20-mm). The container, a capsule 10, as illustrated in FIG. 8 was typically a gel cap size 00 and it is referred to as ignition capsule when it is loaded with a CNT mixture (tens of a milligram). Numerous tests indicated that if there was sufficient material in the container, typically a few milligrams, the gaseous byproducts of the photo-ignition of CNT (mostly $CO_2$ or CO) would pressurize the capsule beyond its 2 atm (~30 psi) limit and would cause it to burst and release its burning contents at the vicinity of the fuel spray and cause the ignition of the spray wherever burning particles and combustible mixture happen to coincide with one another. FIGS. 10A-10C are snapshots of the rupture of the capsule 10 during the photo-ignition of the CNT.

Figure 11:
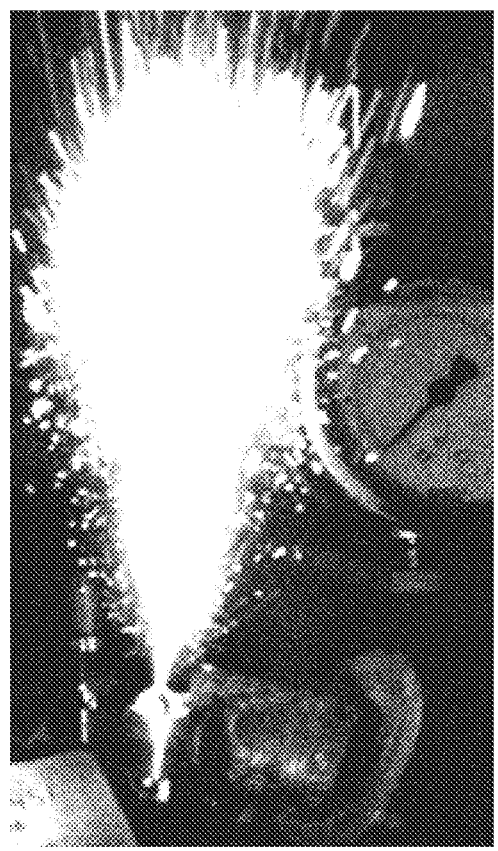
FIG. 11 is a snap shot of an ignition capsule expelling burning particles.

In some embodiments, photo-ignition capsules were used to create the initiation of combustion in a fuel spray by allowing the two-part capsule to burst open in the vicinity of the fuel spray and spread the burning particles toward the combustible mixture of fuel and oxidizer. Further investigations revealed that a 2-3 mm size hole or orifice in an ignition capsule may prevent it from exploding due to over pressurization, if the burn rate was sufficiently low. In such cases the capsule would discharge burning byproducts and burning particles directly through the hole as the pressure is building up in the capsule following the photo-ignition of CNTs, hence it would provide a miniature ignition torch. An example of the operation of a photo-ignition torch is shown in FIG. 11.

At atmospheric pressure, a typical photo-ignition torch may burn close to 0.5 second depending on the burn rate and the amount of fuel in the capsule and it typically discharges a combination of hot gas, flame and burning particles that extends 15-30 cm away from the ignition capsule as a miniature torch. As the ambient pressure is increased beyond about 10 atm (~150 psi), the burn rate gradually picks up and burn duration starts to diminish so that at about 30 atm the burn duration is no more than half of what it is at 10 atm for most CNT mixtures, as investigated. This trend is expected to continue as the pressure is increased beyond 30 atm.

Figure 12:
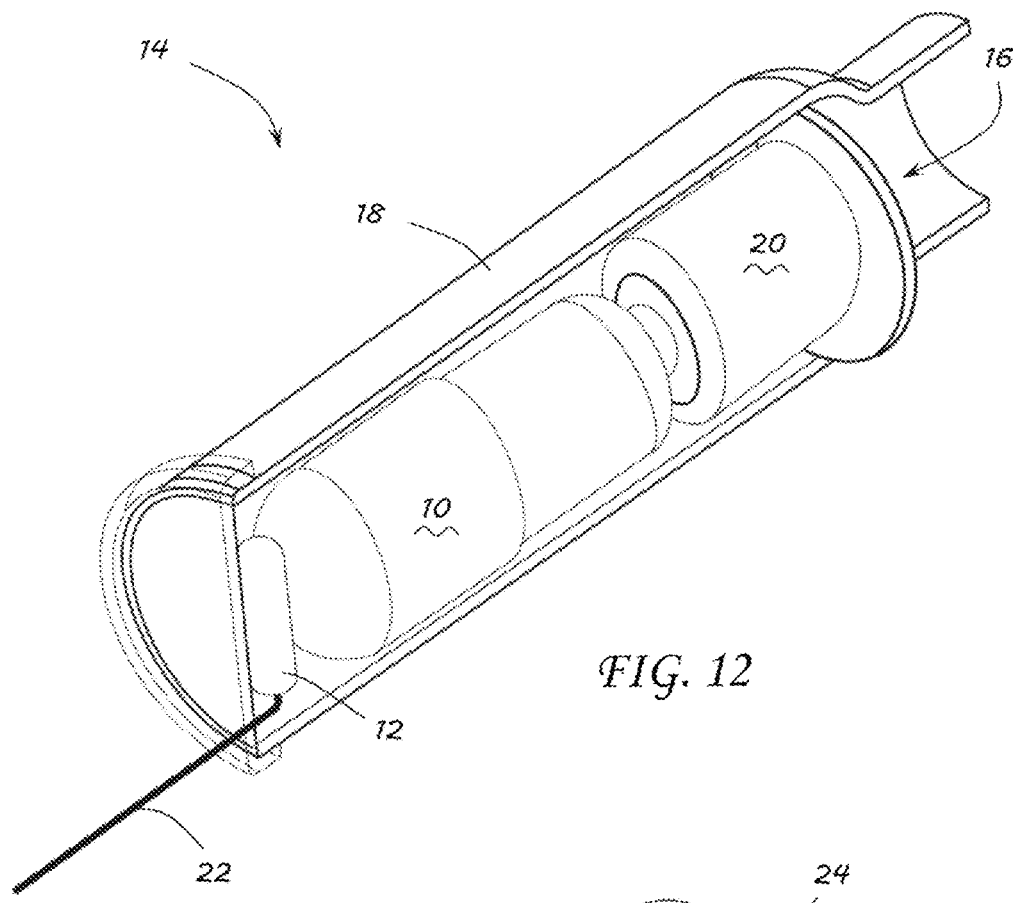
FIG. 12 shows an exemplary configuration of a high pressure ignition torch.

An exemplary photo-ignition torch 14 is illustrated in FIG. 12 including an ignition capsule 10 with a hole 16$b$ to release ignition byproducts, which is typically loaded with CNTs as the main photo-ignition agent as well as solid oxidizer in powdered form and some kind of solid fuels housed in an ignition torch housing, such as a ignition vessel 18. While a fuel spray was ignited with an ignition capsule that contained only CNTs, such an ignition capsule exhibited a number of drawbacks. These are due to the fact that CNTs do not burn long and hot enough and the amount of gas generated may not be sufficient for an effective ignition torch for most applications. In some embodiments, a booster charge 20 may also be included in the photo-ignition torch for additional burn time. The table in FIG. 9 shows examples of ingredients of a typical ignition capsule along with the weight % of each of the ingredients in the capsule. Comments about the relative advantages and possible disadvantages of each specific mixture are also provided. It should be mentioned that each material in the table in FIG. 9 is from the same batch and the total content of the photo-ignition torches were typically 30-70 mg.

As grown carbon nanotube samples with no additives and with added solid oxidizers, aluminum nanoparticles (Al_NP) and solid rocket fuel (SRF) were used as fuel for the photo-ignition torch. The different CNT mixtures exhibited different ignition properties depending on their ingredients. A rough measure of burn temperature and qualitative burn duration of various CNT mixtures were determined through the pyrometer as described previously. The burn duration of most photo-ignition torches were also measured by the high-speed video (>2000 frames/second, fps) camera, which is a more reliable approach.

At elevated pressures, it may be necessary to push the photo-ignition byproducts through the combustion chamber to the ignition chamber with pressurized air before they burn out. This is not necessary where the photo-ignition torch is placed inside the combustion chamber. In ignition experiments with HPIT, an air pressure of 2-4 atm (30-60 psi) above the combustion chamber pressure was used in order to carry ignition byproducts to the high-pressure combustion chamber before they were extinguished. The best photo-ignition torch for 20-50 atm (300-730 psi) pressure has been generated by samples 7 through 10 in the table in FIG. 9, respectively.

The ingredients listed in the table in FIG. 9 are all commercially available except for the solid rocket fuel (SRF) also known as solid propellant that is formulated and prepared in-house. The SRF is typically 87% solid loaded composite propellant composed of hydroxyl-terminated polybutadiene (HTPB) as a binder, ammonium perchlorate as an oxidizer and aluminum powder as a fuel. The granulated SRF was used in the ignition capsules and were made from rubber-like solid chunks of SRF that is mixed from solid powders and polymerized through a proprietary process. It is possible to use commercially available model rocket fuels (MRF) instead of SRF. While MRF is easier to ignite and it typically produces more gas than SRF, it also produces black smoke and leaves behind a film residue on the nearby surfaces. Moreover, MRF in powdered form burns too fast at elevated pressures and it is hard to produce properly sized particles from this brittle material.

Embodiments of the photo-ignition torch charge generally have a total mass of no more than 200 mg, of which about 130 mg is due to the empty capsule and the rest is the CNT mixture as described in the table in FIG. 9. The function of CNTs as the main photo-ignition agent is to produce burning spots throughout the sample in a few milliseconds in order to burn other ingredients subsequently. The amount of CNT in the mixture is typically 1-3 mg. The function of the solid oxidizer is to speed up the propagation of ignition to other solids. For solid oxidizer, boron-potassium nitrate (B+$KNO_3$) and potassium permanganate ($KMnO_4$) were used while ammonium perchlorate (AP) was avoided. Experiments show that the bright white color of AP reduces the chance of photo-ignition mostly due to reduced photon absorption, an essential element of photo-ignition process. However, grinding AP with sufficient amount of activated charcoal produced a gray powder that proved to be an acceptable oxidizer as well.

The role of Aluminum nanoparticles (Al—NP) in embodiments of the invention is to make sure that the temperature increases rapidly enough and gets high enough (exceeding 1500 K) in order to ignite SRF. Al—NP was used in powdered form with a nominal size of 18 nm and 80 nm and both were found to be equally as effective. The only notable difference between the two is the former exhibits photo-ignition and latter does not show such a property up to the maximum fluence that was available, about 3.5 $J/cm^2$. SRF is the main ingredient that provides a burn duration beyond 100 ms and burn temperature well beyond 2000 K. Some embodiments were able to achieve burn durations approaching 1 s at atmospheric pressure by utilizing the same capsule size set forth above (gel cap size 00) and the same ingredients listed in the table in FIG. 9 with no more than 150 mg of CNT mixture. A typical photo-ignition torch has about 30-70 mg of CNT mixture and burns 200-400 ms at atmospheric pressure and 50-100 ms at 50 atm.

The second configuration used for fuel spray ignition in open air was evaluated under a fume hood. In liquid fuel burning experiments, an ignition capsule was positioned close to the path of fuel spray from the ultrasonic atomizer, such that upon ignition and rupture of the photo-ignition capsule the fuel and the burning particles impinge upon one another. The camera flash light source 12 was located very close to the ignition capsule so that it received sufficient energy from the flash to induce photo-ignition of the CNT mixture. The photo-ignition and subsequent fuel ignition and burning process were captured by a high-speed camera, at a rate of 500-2000 frames/second (fps). Only 10 ms after the camera flashed the combustion of the fuel spray is in progress through an expanding fireball that is about 4 cm in diameter and the flame is growing at a rate of several meters per second, depending on the fuel, until the entire combustible mixture is in flame.

The third configuration, referred to as MPTC, was used to study photo-ignition at an elevated pressure up to about 30 atm (-450 psi) under a fume hood. In this case, the compact Xe-flash light source was outside of the chamber and the photo-ignition torch (ignition capsule) was inside, and the light coupling was made available through a 5 cm (2 inch) wide quartz window at a bottom port opposite to a viewing high-speed camera. The byproducts of the ignition were directed upward toward the fuel spray while at the bottom part the ignition capsule was exposed to the light from the Xe-flash source through the quartz window, similar to the configuration illustrated in FIG. 12. The fuel spray was provided through an ultrasonic atomizer and the atomizer was modified to accept a pressurized fuel line. The pressure in the chamber was provided by a high pressure air bottle. The exhaust port was at the bottom of the chamber directing the flow and hot gas through a clod trap. Ignition of different type of fuels with this set up was demonstrated including isopropyl alcohol IPA, methanol and RP1, a category of aerospace fuel similar to kerosene.

In order to use a photo-ignition torch for high pressure applications, a high-pressure ignition torch (HPIT) with a separate ignition chamber was designed and built. The HPIT is capable of sending hot/reacting gases and burning particles beyond 35 cm from the ignition capsule. The body of HPIT is made of brass in order to safely operate at high pressure in an oxygen environment up to about 135 atm (2000 psi). High pressure air is introduced to the HPIT from a K-bottle through an inlet such that the pressure within the ignition chamber stays at least 2 atm (30 psi) above the pressure in the combustion chamber. This excess pressure provides a continuous gas flow in order to carry the hot photo-ignition byproducts into the combustion chamber and provide the opportunity for fuel ignition at the combustion chamber. The entire system was housed in an explosion proof facilty with remote operation capability that provided control signals for the different remote operated values and electrical firing sequence with millisecond accuracy.

The HPIT concept was successfully applied to generate ignition of an $O_2$-H2 coaxial shear injector flow at elevated pressures up to 30 atm (450 psi). In a typical high-pressure $O_2$—$H_2$ combustion experiment, the timing sequence is controlled such that the burning particles arrive at the injector flow region within a few milliseconds before $H_2$ enters the chamber in order to prevent the accumulation of unburned fuel within the chamber. Typically the combustion of fuel happens within a few milliseconds after burning particles first show up in the combustion chamber and the combustion is sustained for as long as it is needed for the study, up to 12 s as tested.

Embodiments of the photo-ignition torch provide numerous burning particles at the exit tube of the torch that is 35 cm away from the ignition capsule. The smallest torch that produced favorable results contained about 10 mg of fuel mixture and was able to introduce hot/reacting gases and burning particles 10-15 cm away from the ignition capsule. Burn duration of an ignition capsule is adjustable between 50-1000 ms at atmospheric pressure depending on the type and amount of its ingredients and the reduction in burn duration is noticeable at elevated pressures beyond 10 atm.

The function of CNTs is to provide photo-ignition at a low light level (less than 0.1 $J/cm^2$), while producing substantial amount of gas to pressurize the capsule. This sets off a chain reaction that ruptures the two part capsule that typically bursts open at about 2 atm (30 psi) of static pressure. Al—NP in the fuel was easily ignited by burning CNTs (about 800 K) and produced a high burning temperature (exceeding 1500 K), which lasted beyond 100-ms. 18 nm Al—NPs showed photo-ignition at high enough fluence (>0.6 $J/cm^2$) without any CNTs. However, Al—NPs produce very little gaseous byproducts, certainly not enough to contribute to the pressure build up within the ignition capsule.

Al-NP burn much longer than CNTs and burn at a high enough temperature to ensure the ignition of SRF particles. In turn SRF particles burn at a very high temperature, well above 2000 K, they produce a substantial amount of gas and burn for substantially longer time, exceeding 500-ms, depending on their size and their surface to volume ratio. It was verified through many tests that a combination of the ingredients in the table in FIG. 9 provides the capability of tailoring the burn temperature, pressure ramp up and burn duration for different applications.

As set out above in the proofs of concept and again referring to FIG. 12, embodiments of the invention include a compact and low-power single or multiple light-generating unit(s) 12 capable of producing ultraviolet, visible and/or infrared electromagnetic radiation. In some of the embodiments, this light-generating unit is a Xe-flash. Positioned next to the light-generating unit is one or more photo-ignitable encapsulated sub-micron particle mix referred to as photo-ignition capsule(s) 10. Some embodiments may also include a primary ignition vessel 18 to spray the hot and burning byproducts of photo-ignition process in a certain direction. The ignition vessel 18 contains one or more photo-ignition capsule(s) 10 and the light source(s) 12. In the simplest configuration of an embodiment of the invention, the photo ignition capsule and the ignition torch may be combined as a single unit as illustrated in FIG. 12. Light source 12 in the ignition vessel 18 may be controlled remotely or via a wired connection 22.

Figure 13:
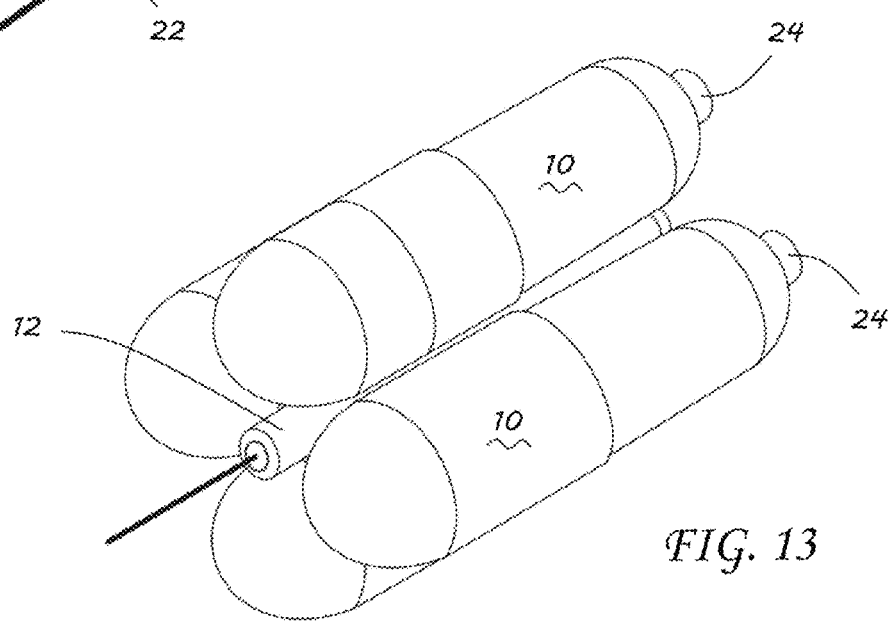
FIG. 13 shows an exemplary configuration with multiple ignition capsules surrounding a light source.
Figure 14:
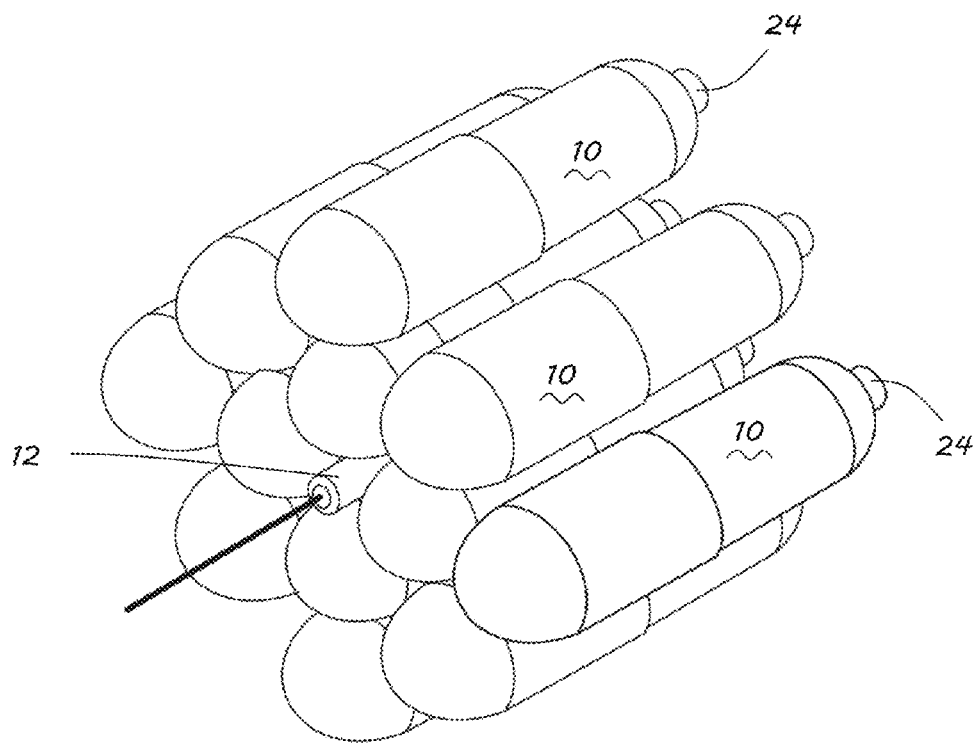
FIG. 14 shows an exemplary configuration with additional ignition capsules surrounding a light source, similar to the embodiment in FIG. 13.

The photo-ignition capsule(s) 10 may be a cylindrical, oval, or spherical volume as small as a fraction of an inch or up to several inches in length and diameter depending on the application in which the capsules 10 are going to be used. The photo-ignition capsules contains materials that absorb ultraviolet, visible and/or infrared light then rapidly heat up and burn if sufficient light is provided/absorbed, typically a faction of $J/cm^2$ of light within a few milliseconds. A number of these materials are summarized above in the tables in FIGS. 1, 3, 5, and 9. Different applications may require energy in excess of a single photo-ignition capsule 10. For these embodiments, and as seen in FIGS. 13 and 14, multiple photo-ignition capsules 10 may surround the light source 12. These photo-ignition capsules may either be sealed with a burst disk 24, or may contain an orifice or nozzle for gas and particle release. Different burst disks 24 may be selected for different embodiments based on desired pressures at which the disk is designed to fail. Failure of these burst disks 24 at designated pressures provides flexibility among embodiments of the invention. Alternatively, in some embodiments, the capsules 10 may be omitted with the photo-ignitable sub-micron particle mix being applied directly to, or in direct contact with the light source 12.

As set forth above, the photo-ignition capsules 10 may be transparent to light or may have a transparent window or port to admit light into the capsule directly. In these embodiments the light source 12 need be in close proximity to the capsules 10. In other embodiments, the light source 12 may be delivered by optical fiber, or in still other embodiments, where the photo-ignition capsules 10 may not be transparent, the light source 12 may be embedded directly in the capsule 10.

As set forth above, the photo-ignition capsules 10 contain carbon nanotube (photo-ignitable agent)+aluminum nano-particles (high temperature fuel)+ammonium percolate (solid oxidizer). Alternatively, the photo-ignition capsules may contain any of the following materials: thermite, metallic nano-materials, solid oxidizer, solid propellant, any form of black powder or pyrotechnic/pyrolant composition including; boron, beryllium, iron, lithium, magnesium, nickel, silicon, titanium, tungsten, zinc, zirconium and aluminum as a fuel. Additionally there may be metal oxides, such as copper-oxide, barium oxide, lead oxide, manganese oxide and iron-oxide and/or thermites of any combination of metallic alloys plus metal-oxidizers may be added in order to achieve various burn temperatures and properties. Also the substitute for ammonium perchlorate oxidizer may include ammonium nitrate ($NH_4NO_3$), potassium nitrate ($KNO_3$), potassium perchlorate ($KClO_4$), boron potassium nitrate (BPN or $BKNO_3$), and potassium permanganate (KPM, $KMnO_4$) or any combination of metal-oxidizers such as metal-oxidizer mixtures such as aluminium-potassium perchlorate and titanium-aluminium-potassium perchlorate, ZPP and BNCP in order to facilitate rapid combustion and gas generation or to make up for the lack of oxygen in the capsule.

In simple embodiments of the invention, there is no booster charge/fuel 20 like that shown in FIG. 12. However, in other embodiments there may be a booster charge 20 in the ignition vessel 18 that is ignited by the primary photo-ignition capsule 10 in order to produce a flame with amplified or otherwise specific properties such as a large gas volume or a long lasting flame. The booster charge 20 may contain any combustible material with the desirable flame properties depending on the application. For example it may contain detonation charge, liquid fuel, solid propellant, or mix of combustible gases.

Figure 15:
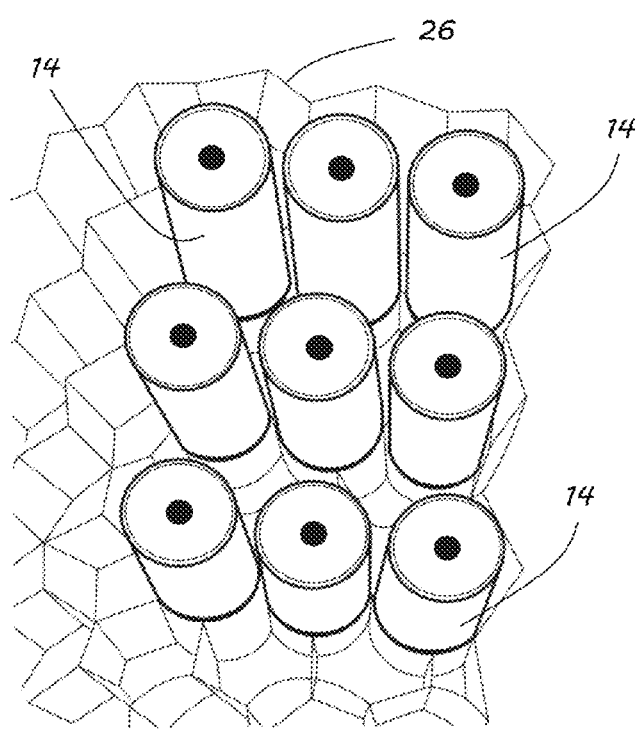
FIG. 15 shows an exemplary configuration of individual photo-ignition torches configured in a honeycomb structure allowing for independent operation.
Figure 16:
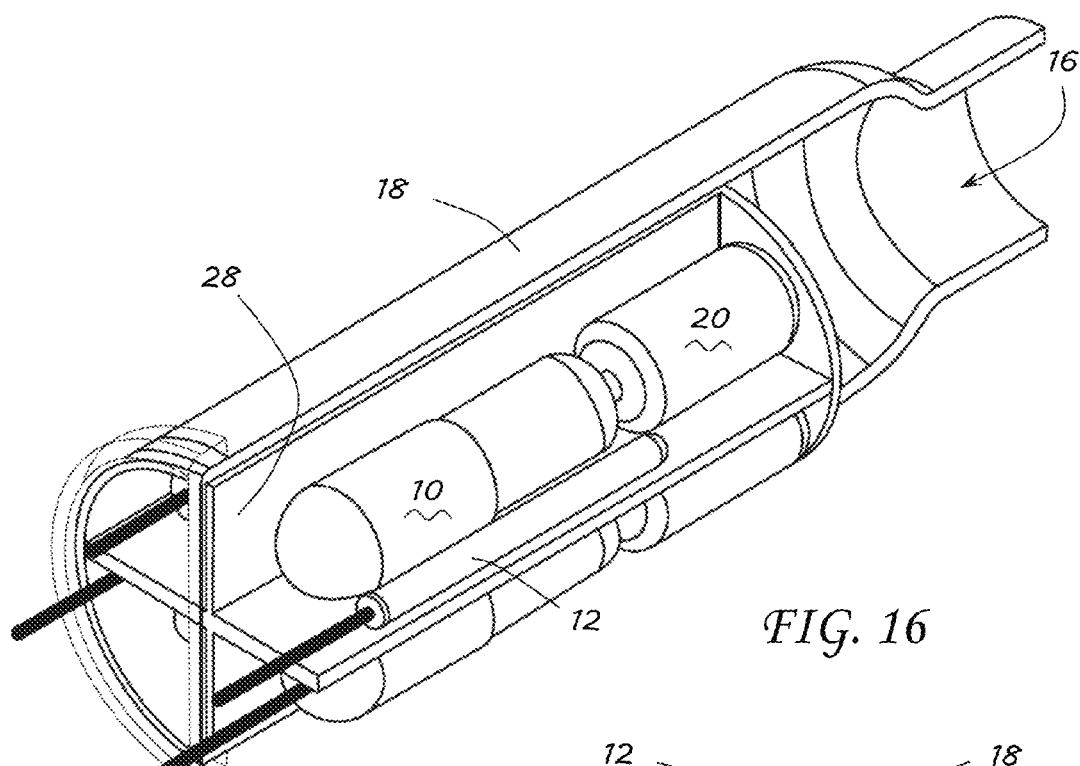
FIG. 16 shows an exemplary multi-torch configuration.
Figure 16A:
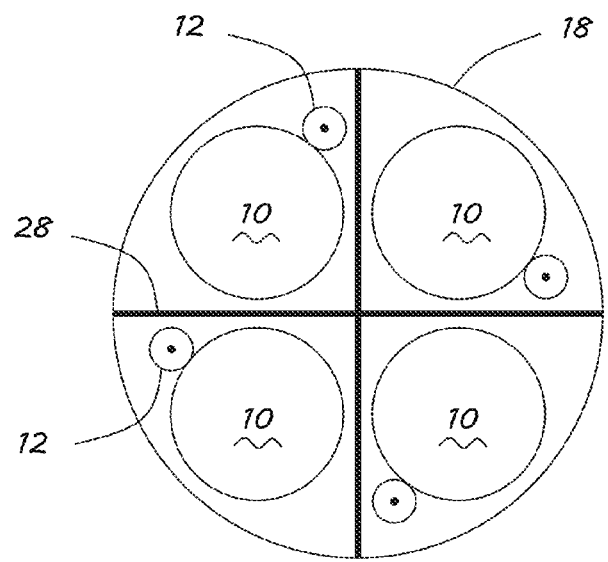
FIG. 16A is an end view of the multi-torch configuration in FIG. 16.
Figure 17:
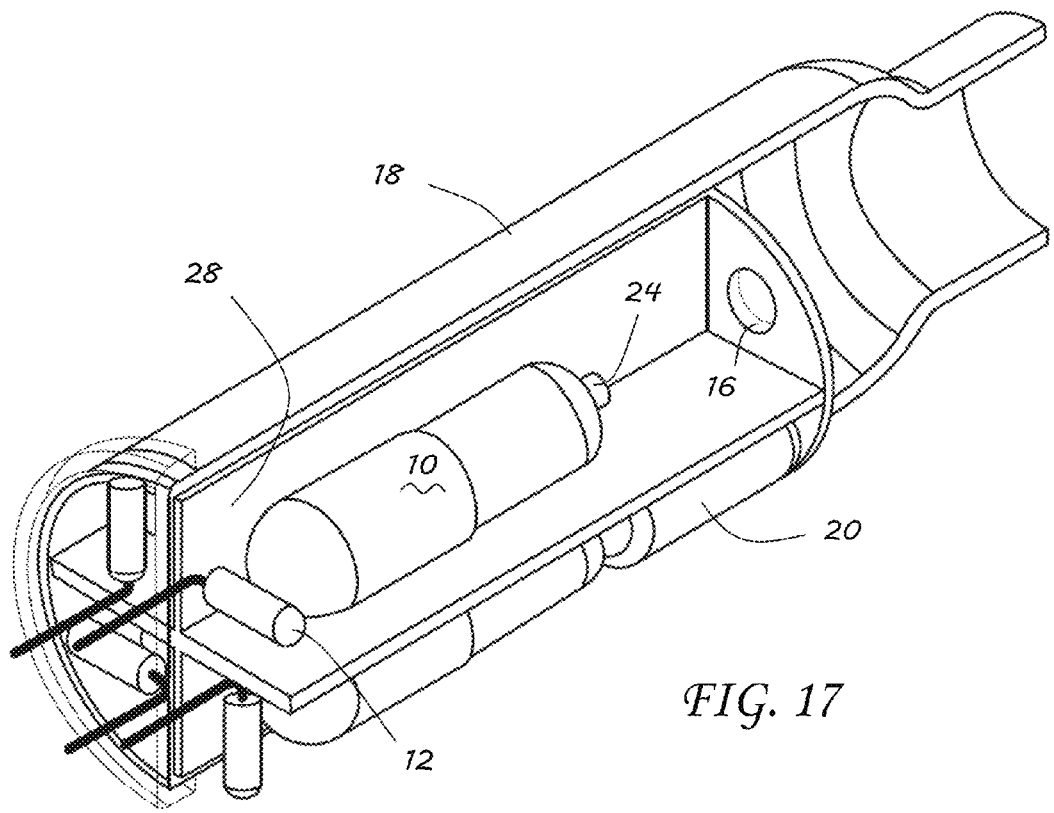
FIG. 17 shows an another exemplary multi-torch configuration.
Figure 17A:
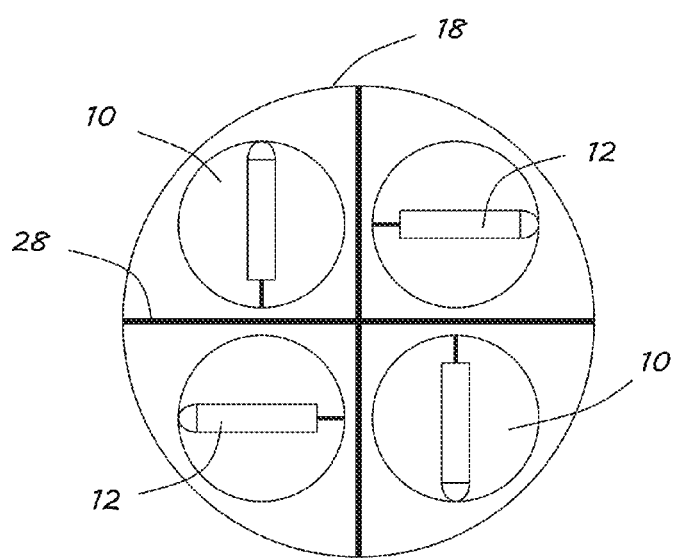
FIG. 17A is an end view of the multi-torch configuration in FIG. 17.
Figure 18:
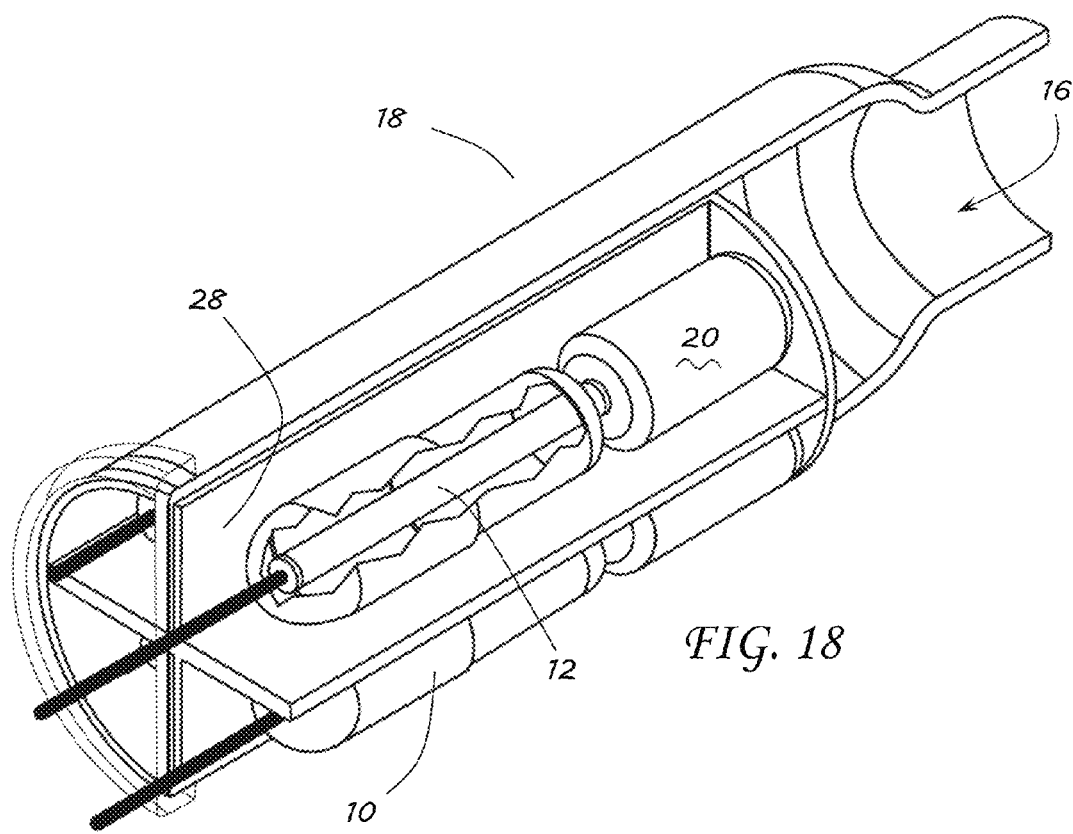
FIG. 18 shows an alternate exemplary multi-torch configuration, where the light source and the solid fuel mixture is inside the capsule.
Figure 18A:
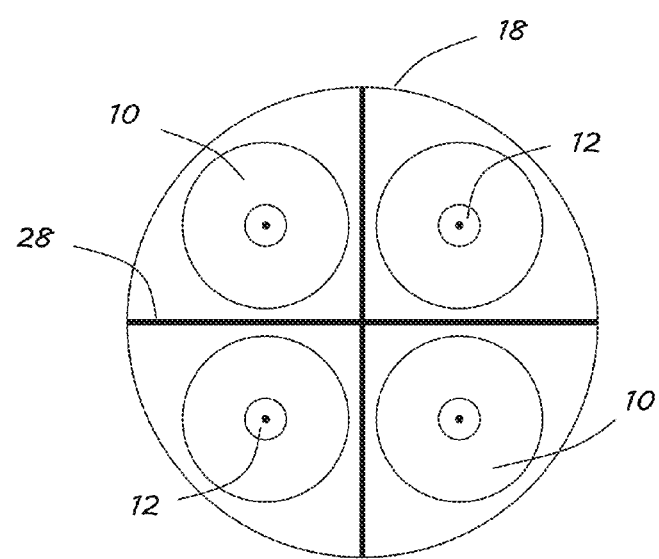
FIG. 18A is an end view of the multi-torch configuration in FIG. 18.

Because the photo-ignition torches 14 are one use devices, embodiments of the invention may contain a collection of such torches 14 in a honeycomb 26 or other structure to enable multiple ignitions as illustrated in FIG. 15. In an alternate embodiment as seen in FIGS. 16-18, the ignition vessel 18 may be compartmentalized with walls 28 separating the photo-ignition capsules 10 and light sources 12. In embodiments additionally including booster charges 20, these may also be separated from each other. The embodiments in FIGS. 16-18, show a ignition vessel 18 holding 4 sets of capsules 10 and light sources 12. Other embodiments may have more or fewer compartments and sets of capsules 10 and light sources 12. The embodiments in FIGS. 16-18 also differ by placement of the light sources 12, along the side of the capsule 10 (FIG. 16), at an end of the capsule 10 (FIG. 17), internal to the capsule 10 (FIG. 18). These embodiments may be configured to fire four independent times, or if additional energy is required, multiple compartments may be fired simultaneously.

Embodiments of the invention may be used for applications beyond ignition, including in gas-generators, pre-burner and field-operated incinerator/fire suppression applications, also for rapid pressurization of a combustion chamber, as well as inflating an airbag. Depending on the application, the content, the size and the strength of the photo-ignition torch may be modified to produce the desired effect.

Creation of a miniature photo-ignition torch was realized through an encapsulated CNT-based fuel mixture. The photo-ignition torch function has been tested up to about 135 atm (2000 psi) of pressure and its suitability for spray ignition at 50 atm (735 psi) has been achieved through certain CNT mixtures, which launches burning particles into the path of the spray. Application of the photo-ignition torch for initiation of combustion in a cryogenic $O_2$—$H_2$ shear coaxial flame at high pressure was demonstrated at an oxygen temperature of about 130 K and a pressure of 35 atm (~520 psi). Embodiments of the photo-ignition torch as described offers the following advantages.

High pressure: the torch works well at high pressures, as it was tested up to 50 atm (750 psi). For certain high-pressure gas turbines it is advantageous to have a backup ignition system that can promptly reignite the system at high pressure without the need to bring the unit back to "cold start" conditions.

Light weight and compact: a typical self-contained ignition system has a mass of less than 50 g and it occupies less than 30 cm$^3$ of space. The ignition capsule is about 200 mg and it contains 50-70 mg of fuel.

Safety: the photo-ignition torch is inherently free of electrostatic discharge because the unit may be battery operated and there is no electrical contact between the ignition source and the ignition charge or fuel. Its electrical circuitry has three separate layers of charge-arm-fire electrical safety in addition to loading of the ignition capsule.

Reliability: the ignition source of photo-ignition torch is based on the mature technology of compact battery operated Xe-flash lamp used in pocket camera units and solid rocket fuels.

Low cost: a typical ignition system is built from inexpensive off-the shelf components and it provides affordable redundancy with negligible effect on the total cost of the rocket or combustion system.

Easy to implement: the compact system can be used as a drop-in unit instead of, or along with, any other ignition system such as spark plugs and electrical match, as a back-up.

Scalable: while the applications of photo-ignition torch have been demonstrated for small scale fuel spray, it can be easily scaled up to be used for much larger combustion chambers.

Suitable for space applications: though fuel burning was demonstrated by CNTs in gaseous/environmental oxygen, preliminary tests have shown that the ignition system may also be implemented with solid oxidizers encapsulated in impermeable layers for space applications and for oxygen deprived environments.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A photo-ignition torch, comprising:
   an light source configured to generate at least one of ultraviolet, visible, and infrared light;
   a photo-ignitable sub-micron particle mix; and
   a transparent capsule proximate the light source and containing the photo-ignitable sub-micron particle mix,
   wherein the exposure of the photo-ignitable sub-micron particle mix to the at least one of ultraviolet, visible, and infrared light initiates a photo-ignition process causing a pressure increase in the transparent capsule and a release of burning byproducts of the photo-ignition process.

2. The photo-ignition torch of claim 1, wherein the exposure of the photo-ignitable sub-micron particle mix to the at least one of ultraviolet, visible, and infrared light initiates the photo-ignition process causing the pressure increase in the transparent capsule and the release of burning byproducts of the photo-ignition process in an environment with a pressure level in excess of 300 psi.

3. The photo-ignition torch of claim 1, wherein a temperature of the burning byproducts of the photo-ignition process is in excess of 500° C.

4. The photo-ignition torch of claim 1, further comprising:
   an ignition vessel encompassing the transparent capsule and the light source; and
   an orifice at one end of the ignition vessel,
   wherein the burning byproducts of the photo-ignition process released from the transparent capsule are released in a stream through the orifice.

5. The photo-ignition torch of claim 4, further comprising:
   a booster charge proximate the transparent capsule.

6. The photo-ignition torch of claim 4, wherein the ignition vessel is divided into at least two compartments separated by at least one wall, each compartment including:
   a transparent capsule containing the photo-ignitable sub-micron particle mix; and
   a light source configured to generate at least one of ultraviolet, visible, and infrared light.

7. The photo-ignition torch of claim 1, wherein the photo-ignitable sub-micron particle mix comprises:
   carbon nanostructures; and
   a high temperature fuel selected from a group consisting of: thermite, metallic nano-materials, solid oxidizer, solid propellant, any form of black powder or pyrotechnic/pyrolant composition including carbon, boron, beryllium, iron, lithium, magnesium, nickel, silicon, titanium, tungsten, zinc, zirconium, and aluminum, and combinations thereof.

8. The photo-ignition torch of claim 7, wherein the photo-ignitable sub-micron particle mix further comprises:
   an oxidizer selected from a group consisting of: copper-oxide, barium oxide, lead oxide, manganese oxide and iron-oxide, thermites, ammonium perchlorate oxidizer, ammonium nitrate, potassium nitrate, potassium perchlorate, boron-potassium nitrate, and potassium permanganate and other metal-oxidizer mixtures such as aluminium-potassium perchlorate and titanium-aluminum-potassium perchlorate, ZPP and BNCP, and combinations thereof.

9. A photo-ignition torch, comprising:
   a light source configured to generate at least one of ultraviolet, visible, and infrared light;
   a photo-ignitable sub-micron particle mix; and
   a capsule configured to receive the at least one of ultraviolet, visible, and infrared light generated by the light source and containing the photo-ignitable sub-micron particle mix,
   wherein the exposure of the photo-ignitable sub-micron particle mix to the at least one of ultraviolet, visible, and infrared light initiates a photo-ignition process causing a pressure increase in the capsule and a release of burning byproducts of the photo-ignition process.

10. The photo-ignition torch of claim 9, wherein the exposure of the photo-ignitable sub-micron particle mix to the at least one of ultraviolet, visible, and infrared light initiates the photo-ignition process causing the pressure increase in the capsule and the release of burning byproducts of the photo-ignition process in an environment with a pressure level in excess of 300 psi.

11. The photo-ignition torch of claim 9, wherein a temperature of the burning byproducts of the photo-ignition process is in excess of 500° C.

12. The photo-ignition torch of claim 9, wherein the capsule comprises:
a burst disk sealing an orifice in the capsule,
wherein the burst disk fails at a designated pressure in the capsule causing the release of the burning byproducts of the photo-ignition process in a stream through the orifice.

13. The photo-ignition torch of claim 9, wherein the capsule comprises:
an orifice in the capsule,
wherein the burning byproducts of the photo-ignition process are released in a stream through the orifice as pressure increases in the capsule.

14. The photo-ignition torch of claim 9, further comprising:
an ignition vessel encompassing the capsule and the light source; and
an orifice at one end of the ignition vessel,
wherein the burning byproducts of the photo-ignition process released from the capsule are released in a stream through the orifice.

15. The photo-ignition torch of claim 14, further comprising:
a booster charge proximate the capsule.

16. The photo-ignition torch of claim 14, wherein the ignition vessel is divided into at least two compartments separated by at least one wall, each compartment including:
a capsule containing the photo-ignitable sub-micron particle mix; and
a light source configured to generate at least one of ultraviolet, visible, and infrared light.

17. The photo-ignition torch of claim 9, wherein the photo-ignitable sub-micron particle mix comprises:
carbon nanostructures; and
a high temperature fuel selected from a group consisting of: thermite, metallic nano-materials, solid oxidizer, solid propellant, any form of black powder or pyrotechnic/pyrolant composition including carbon, boron, beryllium, iron, lithium, magnesium, nickel, silicon, titanium, tungsten, zinc, zirconium, and aluminum, and combinations thereof.

18. The photo-ignition torch of claim 17, wherein the photo-ignitable sub-micron particle mix further comprises:
an oxidizer selected from a group consisting of: copper-oxide, barium oxide, lead oxide, manganese oxide and iron-oxide, thermites, ammonium perchlorate oxidizer, ammonium nitrate, potassium nitrate, potassium perchlorate, boron potassium nitrate, and potassium permanganate and other metal-oxidizer mixtures such as aluminum-potassium perchlorate and titanium-aluminum-potassium perchlorate, ZPP and BNCP, and combinations thereof.

19. A photo-ignition torch, comprising:
a light source configured to generate at least one of ultraviolet, visible, and infrared light; and
a photo-ignitable sub-micron particle mix in contact with the light source,
wherein the exposure of the photo-ignitable sub-micron particle mix to the at least one of ultraviolet, visible, and infrared light initiates a photo-ignition process causing a release of burning byproducts of the photo-ignition process.

20. The photo-ignition torch of claim 19, wherein a temperature of the burning byproducts of the photo-ignition process is in excess of 500° C.

21. The photo-ignition torch of claim 19, further comprising:
an ignition vessel encompassing the photo-ignitable sub-micron particle mix and the light source; and
an orifice at one end of the ignition vessel,
wherein the burning byproducts of the photo-ignition process released in a stream through the orifice.

22. The photo-ignition torch of claim 21, further comprising:
a booster charge proximate the photo-ignitable sub-micron particle mix.

23. The photo-ignition torch of claim 21, wherein the ignition vessel is divided into at least two compartments separated by at least one wall, each compartment including:
a light source configured to generate at least one of ultraviolet, visible, and infrared light; and
a photo-ignitable sub-micron particle mix in contact with the light source.

24. The photo-ignition torch of claim 19, wherein the photo-ignitable sub-micron particle mix comprises:
carbon nanostructures; and
a high temperature fuel selected from a group consisting of: thermite, metallic nano-materials, solid oxidizer, solid propellant, any form of black powder or pyrotechnic/pyrolant composition including carbon, boron, beryllium, iron, lithium, magnesium, nickel, silicon, titanium, tungsten, zinc, zirconium, and aluminum, and combinations thereof.

25. The photo-ignition torch of claim 24, wherein the photo-ignitable sub-micron particle mix further comprises:
an oxidizer selected from a group consisting of: copper-oxide, barium oxide, lead oxide, manganese oxide and iron-oxide, thermites, ammonium perchlorate oxidizer, ammonium nitrate, potassium nitrate, potassium perchlorate, boron potassium nitrate, and potassium permanganate and other metal-oxidizer mixtures such as aluminium-potassium perchlorate and titanium-aluminum-potassium perchlorate, ZPP and BNCP, and combinations thereof.

* * * * *